(12) United States Patent
Li et al.

(10) Patent No.: US 11,017,373 B2
(45) Date of Patent: May 25, 2021

(54) BANK CARD ADDING METHOD, AND APPARATUS

(71) Applicant: Huawei Technologies Co., Ltd., Shenzhen (CN)

(72) Inventors: Guoqing Li, Shenzhen (CN); Jingqing Mei, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/480,865

(22) PCT Filed: May 31, 2017

(86) PCT No.: PCT/CN2017/086689
§ 371 (c)(1),
(2) Date: Jul. 25, 2019

(87) PCT Pub. No.: WO2018/137302
PCT Pub. Date: Aug. 2, 2018

(65) Prior Publication Data
US 2019/0392417 A1 Dec. 26, 2019

(30) Foreign Application Priority Data
Jan. 25, 2017 (CN) .......................... 201710061359.3

(51) Int. Cl.
*G06Q 20/32* (2012.01)
*G06Q 20/06* (2012.01)
*G06Q 20/36* (2012.01)

(52) U.S. Cl.
CPC ..... *G06Q 20/3221* (2013.01); *G06Q 20/0658* (2013.01); *G06Q 20/3223* (2013.01); *G06Q 20/363* (2013.01); *G06Q 20/3672* (2013.01)

(58) Field of Classification Search
CPC ........ G06Q 10/00; G06Q 20/00; G06Q 30/00; G06Q 40/00
(Continued)

(56) References Cited

U.S. PATENT DOCUMENTS 8,566,239 B2 * 10/2013 Arthur .................. G06Q 10/00
705/41
8,612,352 B2 * 12/2013 Dorsey .............. G06Q 20/3226
705/44

(Continued)

FOREIGN PATENT DOCUMENTS

| CN | 104065639 A | 9/2014 |
|---|---|---|
| CN | 104102995 A | 10/2014 |

(Continued)

OTHER PUBLICATIONS

"More on How U.S. Banks Aim to Get Smart", American Banker; vol. 165, ISSN 00027561, New York, N.Y, Sep. 20 . (Year: 2000).*

(Continued)

*Primary Examiner* — Frantzy Poinvil
(74) *Attorney, Agent, or Firm* — Conley Rose, P.C.

(57) ABSTRACT

A system comprising: a first mobile phone and a second mobile phone, the first mobile phone having a first digital wallet, the second mobile phone having a second digital wallet including a first payment card, the first mobile phone being capable of directly connecting with the second mobile phone via a wireless communication connection. The first mobile phone send to the second mobile phone a first request for obtaining a first data related to the first payment card. In response to the first request, the second mobile phone send directly to the first mobile phone via the wireless communication connection, the first data. The first mobile phone add the first payment card into the first digital wallet based on the received first data.

20 Claims, 16 Drawing Sheets

(58) Field of Classification Search
USPC .......................................................... 705/3–41
See application file for complete search history.

(56) References Cited

U.S. PATENT DOCUMENTS

| | | | | |
|---|---|---|---|---|
| 8,615,445 | B2* | 12/2013 | Dorsey | G06Q 20/24 705/26.1 |
| 8,662,389 | B2* | 3/2014 | Dorsey | G06Q 20/3224 235/380 |
| 8,671,055 | B2* | 3/2014 | Spodak | G06K 19/06187 705/41 |
| 8,763,896 | B2* | 7/2014 | Kushevsky | G06Q 20/227 235/379 |
| 8,765,055 | B2* | 7/2014 | Christoph | A61M 5/141 422/44 |
| 2011/0039585 | A1* | 2/2011 | Rouse | G06Q 20/02 455/466 |
| 2013/0246145 | A1* | 9/2013 | Ringewald | G06Q 20/227 705/14.23 |
| 2013/0246260 | A1* | 9/2013 | Barten | G06Q 20/3674 705/41 |
| 2014/0129435 | A1* | 5/2014 | Pardo | G06Q 20/227 705/41 |
| 2014/0246145 | A1* | 9/2014 | Kurtz | B29C 70/52 156/244.23 |
| 2015/0127530 | A1* | 5/2015 | Wick | G06Q 20/3223 705/39 |
| 2015/0127539 | A1 | 5/2015 | Ye et al. | |
| 2015/0348014 | A1* | 12/2015 | Van Os | G06Q 30/0631 705/41 |
| 2015/0348018 | A1* | 12/2015 | Campos | G06Q 20/12 705/41 |
| 2015/0348029 | A1* | 12/2015 | Van Os | H04M 1/72522 705/44 |
| 2016/0180332 | A1* | 6/2016 | Wilczynski | G06Q 20/36 705/41 |

FOREIGN PATENT DOCUMENTS

| | | |
|---|---|---|
| CN | 104918234 A | 9/2015 |
| CN | 105631496 A | 6/2016 |
| CN | 103312680 B | 10/2016 |
| CN | 106296177 A | 1/2017 |
| CN | 106327188 A | 1/2017 |
| WO | 2015067038 A1 | 5/2015 |

OTHER PUBLICATIONS

"Users want foolproof State Govt e-Wallet", ProQuest Document Id. 1859882592,The Assam Tribune Jan. 18 (Year: 2017).*
Machine Translation and Abstract of Chinese Publication No. CN104102995, Oct. 15, 2014, 13 pages.
Machine Translation and Abstract of Chinese Publication No. CN103312680, Oct. 5, 2016, 28 pages.
Machine Translation and Abstract of Chinese Publication No. CN104918234, Sep. 16, 2015, 13 pages.
Machine Translation and Abstract of Chinese Publication No. CN105631496, Jun. 1, 2016, 20 pages.
Machine Translation and Abstract of Chinese Publication No. CN106296177, Jan. 4, 2017, 21 pages.
Machine Translation and Abstract of Chinese Publication No. CN106327188, Jan. 11, 2017, 17 pages.
Foreign Communication From a Counterpart Application, PCT Application No. PCT/CN2017/086689, English Translation of International Search Report dated Jul. 28, 2017, 2 pages.
Foreign Communication From a Counterpart Application, PCT Application No. PCT/CN2017/086689, English Translation of Written Opinion dated Jul. 28, 2017, 4 pages.
Foreign Communication From a Counterpart Application, Chinese Application No. 201780009311.6, Chinese Office Action dated Apr. 16, 2019, 7 pages.

* cited by examiner

BANK CARD ADDING METHOD, AND APPARATUS

This application is a national stage of International Application No. PCT/CN2017/086689, filed on May 31, 2017, which claims priority to Chinese Patent Application No. 201710061359.3, filed on Jan. 25, 2017. Both of the aforementioned applications are hereby incorporated by reference in their entireties.

TECHNICAL FIELD

Embodiments of the present invention relate to the terminal field, and in particular, to a bank card adding method and an apparatus.

BACKGROUND

After the physical bank card is bound to the terminal to form the virtual bank card, the terminal can be used to tap a card reader of an NFC point of sale (Point of Sale, POS) terminal, where this action is also referred to as "tap (Tap)", so that payment through card tapping can be made. This is referred to as "QuickPass" by UnionPay.

In the prior art, in a process of binding a physical bank card to a terminal to generate a virtual bank card, a card number on a card first needs to be photographed, an NFC function of the terminal needs to be enabled to read a bank card number, or a user needs to manually enter bank card account information such as a primary account number (Primary Account Number, PAN), a validity period, and a Card Verification Value (Card Verification Value, CVV); and then, one time of verification is performed on a cardholder. Specifically, as shown in FIG. 1, FIG. 1 is a schematic diagram of a process of binding a physical bank card to a terminal to generate a virtual bank card.

For a card issuer, the process of binding a physical bank card to a terminal to generate a virtual bank card is equivalent to one time of conventional online payment in which verification needs to be performed on an identity of a cardholder by checking the bank card account information or a withdrawal password and by sending art SMS verification code to a mobile phone number reserved by the cardholder. This is required by bank card transaction security.

However, each user of a payment application on a terminal may have a plurality of debit cards or credit cards, and may bind a plurality of cards in the payment application of the user, to obtain preferences of different banks. Currently, a smartphone may be upgraded after being used for one to three years, or factory reset is performed during repair after the terminal is faulty. In this case, the physical bank card needs to be bound to a terminal again. At present, a terminal payment application designed by a terminal manufacturer does not store bank card account information, and virtual bank card data stored in an eSE is not allowed to be copied. Consequently, the physical bank card can be added to a new terminal only by entering the bank card account information and performing verification on a cardholder. Currently, the user can only bind physical bank cards one by one to the new terminal or the terminal obtained after repair. An information input process is rather complex, causing poor user experience.

SUMMARY

Embodiments of the present invention provide a bank card adding method and an apparatus, to effectively improve user experience.

To resolve the foregoing technical problem, the embodiments of the present invention provide the following technical solutions:

According to a first aspect of the embodiments of the present invention, a bank card adding method is provided, applied to a first terminal that has a protected operating environment. The method includes: receiving, by the first terminal, a bank card adding request; establishing, by the first terminal, a peer-to-peer wireless communication connection to a second terminal, and sending a request for obtaining bank card data to the second terminal; obtaining, by the first terminal, bank card account information based on the bank card data after receiving the bank card data sent by the second terminal; and sending, by the first terminal, a card issuing request to a first server, to add a bank card to the first terminal, where the card issuing request includes the bank card account information. In this embodiment of this application, the first terminal obtains backup data of the related bank card account information from the second terminal through the peer-to-peer wireless communication connection to the second terminal, and binds a physical bank card to the first terminal by using the backup data, to generate a virtual bank card. Therefore, a user does not need to enter the bank card account information on the first terminal in a non-automatic manner (photographing, NFC reading, or manual input) to perform card issuing, so that user operation steps are simplified, and user experience is effectively improved. It should be noted that the protected operating environment is a Trusted Execution Environment (Trusted Execution Environment, TEE) or a secure element (Secure Element, SE). An SE in a terminal is in three forms: an eSE in a form of an independent chip fastened on a main board of the terminal, a SIM SE that is integrated into a subscriber identification module (Subscriber Identification Module, SIM) card and that is connected to the terminal by using a SIM card slot, or an SD SE that is integrated into a microprocessor (micro) secure digital memory card (Secure Digital Memory Card, SD) card and that is connected to the terminal by using an SD card slot and a Universal Serial Bus (Universal Serial Bus, USB) interface. The last two types of SEs are external and removable, but the eSE is built into the terminal.

To simplify user operation steps and effectively improve user experience, with reference to the first aspect, in a possible implementation, after the receiving, by the first terminal, a bank card adding request and before the establishing, by the first terminal, a peer-to-peer wireless communication connection to a second terminal, the method further includes: displaying at least a first option and a second option on a display screen of the first terminal, where the first option is: entering a bank card number, scanning a bank card, or reading a number through card tapping, and the second option is: obtaining the bank card data from another terminal.

To simplify user operation steps and effectively improve user experience, with reference to the foregoing possible implementation, in another possible implementation, the method further includes: displaying an identifier of at least one of the other terminals under the second option; or displaying an identifier of at least one of the other terminals after the first terminal receives selection of a user for the second option, where the another terminal includes the second terminal, and the another terminal and the first terminal log in to a same account.

With reference to the foregoing possible implementations, in another possible implementation, the sending, by the first terminal, a request for obtaining bank card data to the second terminal specifically includes: sending, by the first terminal, a verification credential and/or a first terminal certificate to the second terminal through the peer-to-peer wireless communication connection, where the verification credential includes a service credential and an identity credential, the first terminal certificate is a terminal certificate preconfigured in the TEE of the first terminal, the service credential is used to prove that a service in which the first terminal obtains the bank card data is valid, and the identity credential is used to prove that a login account in the first terminal is valid. Therefore, the first terminal sends the verification credential and/or the first terminal certificate to the second terminal to obtain the bank card data, so that bank card data obtaining security is improved.

With reference to the foregoing possible implementations, in another possible implementation, the receiving, by the first terminal, the bank card data sent by the second terminal specifically includes: receiving, by the first terminal, first encrypted data sent by the second terminal, where the first encrypted data includes first encrypted bank card data, an identifier of an image processing algorithm, and a parameter used in the image processing algorithm that are encrypted by using a public key of the first terminal and that are signed by using a private key of the second terminal, the first encrypted bank card data includes a bank card account information image, the bank card account information image includes the bank card account information, and the bank card account information is used to identify the bank card; or receiving, by the first terminal, second encrypted data sent by the second terminal, where the second encrypted data includes to-be-migrated data that is encrypted by using a public key of the first terminal and that is signed by using a private key of the second terminal, and the to-be-migrated data includes a bank identification number (Bank Identification Number, BIN) and the last four digits of a PAN. Therefore, to simplify user operation steps and effectively improve user experience, this embodiment of this application provides a specific implementation of obtaining bank card data, where the bank card data provided by the second terminal for the first terminal includes the first encrypted data or the second encrypted data, so that the first terminal performs card issuing based on the bank card data.

With reference to the foregoing possible implementation, in another possible implementation, the first terminal obtains the bank card account information in the protected operating environment based on the bank card data, so that security of obtaining the bank card account information by the first terminal is improved.

With reference to the foregoing possible implementation, in another possible implementation, the obtaining, by the first terminal, bank card account information based on the bank card data includes: performing, by the first terminal in the TEE by using a public key of the second terminal, verification on a signature generated by using the private key of the second terminal, and decrypting the first encrypted data by using a private key of the first terminal, to obtain the first encrypted bank card data, the identifier of the image processing algorithm, and the parameter used in the image processing algorithm; decrypting, by the first terminal in the TEE, the first encrypted bank card data based on the image processing algorithm corresponding to the identifier of the image processing algorithm and the parameter used in the image processing algorithm, to obtain the bank card account information image; and processing, by the first terminal in the TEE, the bank card account information image by using an optical character recognition (Optical Character Recognition, OCR) algorithm, to obtain the bank card account information. Therefore, the bank card data transmitted between the first terminal and the second terminal is encrypted and decrypted by using the public key and the private key, to obtain the bank card account information, so that bank card data obtaining security is effectively improved.

With reference to the foregoing possible implementation, in another possible implementation, the obtaining, by the first terminal, bank card account information based on the bank card data includes: performing, by the first terminal in the TEE by using a public key of the second terminal, verification on a signature generated by using the private key of the second terminal, and decrypting the second encrypted data by using a private key of the first terminal, to obtain the to-be-migrated data; sending, by the first terminal to the first server, the first terminal certificate, the to-be-migrated data, and the signature generated by the second terminal for the to-be-migrated data; and receiving, by the first terminal, the bank card account information sent by the first server. Therefore, the bank card data transmitted between the first terminal and the second terminal is encrypted and decrypted by using the public key and the private key, to obtain the bank card account information, so that bank card data obtaining security is effectively improved.

With reference to the foregoing possible implementations, in another possible implementation, after the first terminal receives the selection of the user for the second option, the method further includes: obtaining, by the first terminal, the service credential from the first server, where the service credential includes a service number and a signature generated by the first server for the service number; and storing, by the first terminal, the service credential into the TEE. This embodiment of the present invention provides a specific implementation of obtaining the service credential, so that bank card data obtaining security is effectively improved.

With reference to the foregoing possible implementation, in another possible implementation, the method further includes: sending, by the first terminal, the service number to a second server by using a same account as that of the second terminal; receiving, by the first terminal, the identity credential sent by the second server, where the identity credential includes the service number and a signature generated by the second server for the service number; and storing, by the first terminal, the identity credential into the TEE. This embodiment of the present invention provides a specific implementation of obtaining the identity credential, so that bank card data obtaining security is effectively improved.

With reference to the foregoing possible implementation, in another possible implementation, the first terminal sends a first deregistration message to the first server, where the first deregistration message is used to instruct the first server to deregister the service credential; and/or the first terminal sends a second deregistration message to the second server, where the second deregistration message is used to instruct the second server to deregister the identity credential. Therefore, the first terminal sends a service credential deregistration request to the first server, and sends an identity credential deregistration request to the second server, to deregister the two credentials and prevent a replay attack.

According to a second aspect of the embodiments of the present invention, a bank card adding method is provided, applied to a second terminal that has a protected operating environment, and including: establishing, by the second terminal, a peer-to-peer wireless communication connection to a first terminal; receiving, by the second terminal, a request that is for obtaining bank card data and that is sent by the first terminal; and sending, by the second terminal, the bank card data to the first terminal. In this embodiment of this application, the second terminal provides backup data of related bank card account information for the first terminal by establishing the peer-to-peer wireless communication connection to the first terminal, so that the first terminal binds a physical bank card to the first terminal by using the backup data, to generate a virtual bank card. Therefore, a user does not need to enter the bank card account information on the first terminal in a non-automatic manner (photographing, NFC reading, or manual input) to perform card issuing, so that user operation steps are simplified, and user experience is effectively improved.

With reference to the foregoing possible implementation, in another possible implementation, the second terminal includes a TEE and an SE, and before the establishing, by the second terminal, a peer-to-peer wireless communication connection to a first terminal, the method further includes: receiving, by the second terminal, a bank card adding request; obtaining, by the second terminal, a bank card account information image based on the bank card adding request; performing, by the second terminal, image encryption processing on the bank card account information image based on an image processing algorithm, to obtain first encrypted bank card data; encrypting, by the second terminal, the first encrypted bank card data by using a public key of the second terminal, to obtain second encrypted bank card data; setting, by the second terminal, an access password for the second encrypted bank card data, to obtain first backup data; and storing, by the second terminal, the first backup data into the TEE, and storing, into the eSE, an identifier of the image processing algorithm and a parameter used in the image processing algorithm. Therefore, after performing three levels of encryption on the bank card account information image, the second terminal stores the first backup data into the TEE, and stores, into the eSE, the identifier of the image processing algorithm and the parameter used in the image processing algorithm, so that backup data storage security is improved.

With reference to the foregoing possible implementation, in another possible implementation, the second terminal includes a TEE, and before the establishing, by the second terminal, a peer-to-peer wireless communication connection to a first terminal, the method further includes: receiving, by the second terminal, a bank card adding request; obtaining, by the second terminal, to-be-migrated data based on the bank card adding request, where the to-be-migrated data includes a BIN and the last four digits of a PAN; encrypting, by the second terminal, the to-be-migrated data based on a public key of the second terminal, to obtain second backup data; storing, by the second terminal, the second backup data into the TEE; and sending, by the second terminal, a buffer request to a first server, where the buffer request includes the last four digits of the PAN and a second terminal certificate, and the buffer request is used to request the first server to associate bank card account information related to the last four digits of the PAN with the second terminal certificate. Therefore, after encrypting the BIN and the last four digits of the PAN, the second terminal stores the second backup data into the TEE, so that backup data storage security is improved. In addition, the first server pre-stores the bank card account information related to the last four digits of the PAN, so that security of obtaining, by the first terminal, the bank card account information related to the last four digits of the PAN is further improved.

With reference to the foregoing possible implementations, in another possible implementation, the receiving a request that is for obtaining bank card data and that is sent by the first terminal specifically includes: receiving a verification credential and a first terminal certificate that are sent by the first terminal, where the verification credential includes a service credential and an identity credential, the first terminal certificate is a terminal certificate preconfigured in a TEE of the first terminal, the service credential is used to prove that a service in which the first terminal obtains the bank card data is valid, and the identity credential is used to prove that a login account in the first terminal is valid.

With reference to the foregoing possible implementations, in another possible implementation, after the receiving, by the second terminal, a request that is for obtaining bank card data and that is sent by the first terminal, the method further includes: performing, by the second terminal, verification on the service credential, the identity credential, and the first terminal certificate; and if the verification performed by the second terminal on the service credential, the identity credential, and the first terminal certificate succeeds, generating, by the second terminal, first encrypted data, where the first encrypted data includes the first encrypted bank card data, the identifier of the image processing algorithm, and the parameter used in the image processing algorithm that are encrypted by using a public key of the first terminal and that are signed by using a private key of the second terminal, the first encrypted bank card data includes the bank card account information image, the bank card account information image includes the bank card account information, and the bank card account information is used to identify a bank card; or generating, by the second terminal, second encrypted data, where the second encrypted data includes the to-be-migrated data that is encrypted by using a public key of the first terminal and that is signed by using a private key of the second terminal, and the to-be-migrated data includes the BIN and the last four digits of the PAN. Therefore, the bank card data transmitted between the first terminal and the second terminal is encrypted and decrypted by using the public key and the private key, to obtain the bank card account information, so that bank card data obtaining security is effectively improved.

With reference to the foregoing possible implementations, in another possible implementation, the performing, by the second terminal, verification on the service credential, the identity credential, and the first terminal certificate specifically includes: obtaining, by the second terminal, a first server certificate and a second server certificate; performing, by the second terminal, verification on the service credential based on the first server certificate, and performing verification on the identity credential based on the second server certificate; and performing, by the second terminal, verification on the first terminal certificate by using a root certificate of a certificate authority. This embodiment of the present invention provides a specific implementation of performing verification on the service credential, the identity credential, and the first terminal certificate, so that bank card data obtaining security is effectively improved.

With reference to the foregoing possible implementations, in another possible implementation, the second terminal sends the bank card data to the first terminal, where the bank card data includes the first encrypted data or the second encrypted data. This embodiment of the present invention provides a specific implementation of the bank card data.

With reference to the foregoing possible implementations, in another possible implementation, when the bank card data sent by the second terminal to the first terminal includes the second encrypted data, after the sending, by the second terminal, the bank card data to the first terminal, the method further includes: sending, by the second terminal, the first terminal certificate to the first server, so that the first server associates the first terminal certificate with the bank card account information. In this way, when the first terminal sends, to the first server, a request to obtain the bank card account information, the first server may check an identity of the first terminal by using the first terminal certificate provided by the second terminal, to be specific, determine, through comparison, whether a certificate of the terminal that requests to obtain the bank card account information is consistent with the certificate sent by the second terminal.

According to a third aspect of the embodiments of the present invention, a first terminal is provided, where the first terminal has a protected operating environment, the protected operating environment is a Trusted Execution Environment TEE or a secure element SE, and the first terminal includes: a receiving unit, configured to receive a bank card adding request; a connection unit, configured to establish a peer-to-peer wireless communication connection to a second terminal: a sending unit, configured to send a request for obtaining bank card data to the second terminal, where the receiving unit is further configured to receive the bank card data sent by the second terminal; and a processing unit, configured to obtain bank card account information based on the bank card data, where the sending unit is further configured to send a card issuing request to a first server, to add a bank card to the first terminal, where the card issuing request includes the bank card account information.

According to a fourth aspect of the embodiments of the present invention, a second terminal is provided, applied to the second terminal that has a protected operating environment, and including: a connection unit, configured to establish a peer-to-peer wireless communication connection to a first terminal; a receiving unit, configured to receive a request that is for obtaining bank card data and that is sent by the first terminal; and a sending unit, configured to send the bank card data to the first terminal.

It should be noted that, the function modules in the third aspect and the fourth aspect may be implemented by using hardware, or may be implemented by hardware by executing corresponding software. The hardware or the software includes one or more modules corresponding to the foregoing functions, for example, a transceiver, configured to implement functions of the receiving unit and the sending unit; a processor, configured to implement a function of a processing unit; and a memory, configured to be used by the processor to process a program instruction of the bank card adding method in the embodiments of this application. The processor, the transceiver, and the memory are connected and implement mutual communication by using a bus. For details, refer to a function of an action of the first terminal in the bank card adding method provided in the first aspect, and a function of an action of the second terminal in the bank card adding method provided in the second aspect.

According to a fifth aspect, an embodiment of this application provides a first terminal, including: a processor, a memory, a bus, and a communications interface, where the memory is configured to store a computer executable instruction; the processor and the memory are connected by using the bus; and when the first terminal runs, the processor executes the computer executable instruction stored in the memory, so that the first terminal performs the bank card adding method in any of the foregoing aspects.

According to a sixth aspect, an embodiment of this application provides a second terminal, including: a processor, a memory, a bus, and a communications interface, where the memory is configured to store a computer executable instruction; the processor and the memory are connected by using the bus; and when the second terminal runs, the processor executes the computer executable instruction stored in the memory, so that the second terminal performs the bank card adding method in any of the foregoing aspects.

According to a seventh aspect, an embodiment of this application provides a computer readable storage medium, configured to store a computer software instruction used by the foregoing first terminal. When the computer software instruction runs on a computer, the computer is enabled to perform the method in any of the foregoing aspects.

According to an eighth aspect, an embodiment of this application provides a computer readable storage medium, configured to store a computer software instruction used by the foregoing second terminal. When the computer software instruction runs on a computer, the computer is enabled to perform the method in any of the foregoing aspects.

According to a ninth aspect, an embodiment of this application provides a computer program product including an instruction. When the instruction runs on a computer, the computer is enabled to perform the method in any of the foregoing aspects.

In addition, for technical effects brought by any design manner of the third to the ninth aspects, refer to the technical effects brought by different design manners of the first aspect and the second aspect. Details are not described herein again.

In the embodiments of this application, names of the first terminal, the second terminal, the first server, and the second server impose no limitation on the devices. In actual implementation, these devices may have other names, provided that functions of the devices are similar to those in the embodiments of this application and fall within the scope of the claims of this application and their equivalent technologies.

These aspects or other aspects in the embodiments of this application are more brief and comprehensible in descriptions of the following embodiments.

DESCRIPTION OF EMBODIMENTS

Embodiments of the present invention provide a bank card adding method. A bank card may be a credit card (credit card) or a debit card (debit card), and a basic principle of the bank card adding method is as follows: Most of terminals having an NFC payment function usually support a protected operating environment, for example, a TEE and/or an eSE. When a user needs to bind a physical bank card to a first terminal to generate a virtual bank card, the first terminal first establishes a peer-to-peer wireless communication connection (such as a Bluetooth (Bluetooth, BT) connection, an NFC peer-to-peer connection, an NFC connection, or a Wi-Fi peer to peer (Wi-Fi Peer to Peer, Wi-Fi P2P) connection) to a second terminal. Then, after performing verification on an identity of the first terminal, the second terminal sends backup data to the first terminal. The first terminal obtains bank card account information in a protected operating environment of the first terminal based on the obtained backup data, generates a card issuing request by using the obtained bank card account information, and finally performs card issuing on the first terminal successfully, to be specific, installs a virtual bank card returned by a first server in an eSE of the first terminal. It should be noted that after the user binds the physical bank card to the second terminal to generate the virtual bank card for the first time, with user permission and/or authentication, the backup data is generated in the second terminal, and the backup data is stored by using secure hardware (such as trusted storage space of a TEE or storage space of an eSE) in a protected operating environment of the second terminal. In this way, in the embodiments of this application, the first terminal obtains the backup data of the related bank card account information from the second terminal through the peer-to-peer wireless communication connection to the second terminal, and binds the physical bank card to the first terminal by using the backup data, to generate the virtual bank card. Therefore, the user does not need to enter the bank card account information (which includes a PAN, a validity period, a CVV, and the like, and may further include a mobile phone number reserved in a bank for the bank card, and the like) on the first terminal in a non-automatic manner (photographing, NFC reading, or manual input) to perform card issuing, so that user operation steps are simplified, and user experience is effectively improved.

The following describes the implementations of the embodiments of the present invention in detail with reference to accompanying drawings.

Figure 2:
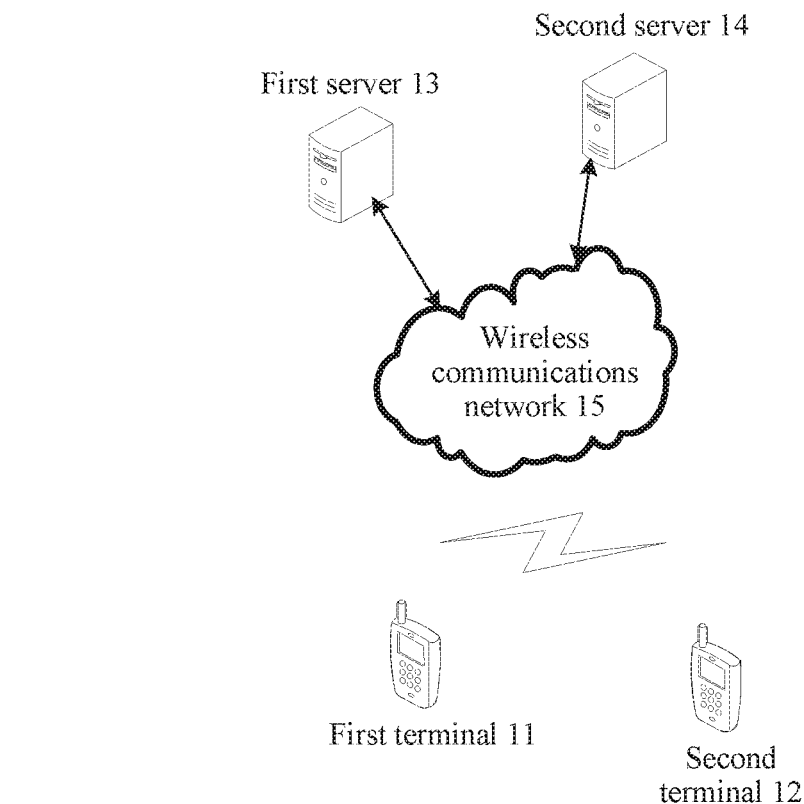
FIG. 2 is a simplified schematic diagram of a system architecture according to an embodiment of the present invention.

FIG. 2 is a simplified schematic diagram of a system architecture to which an embodiment of the present invention can be applied. As shown in FIG. 2, the system architecture may include a first terminal 11, a second terminal 12, a first server 13, a second server 14, and a wireless communications network 15.

The first terminal 11 and the second terminal 12 are devices (device) that provide a voice and/or data connectivity for a user, for example, a mobile phone, a tablet computer, a notebook computer, an ultra-mobile personal computer (Ultra-mobile Personal Computer, UMPC), a netbook, or a personal digital assistant (Personal Digital Assistant, PDA). In an embodiment, as shown in FIG. 2, the first terminal 11 and the second terminal 12 included in the system architecture in the present invention are mobile phones. The first terminal and the second terminal communicate with the first server and the second server by using a wireless communications technology. The second terminal may communicate with the first terminal through a peer-to-peer wireless communication connection.

The first server 13 is a token service provider (Token Service Provider, TSP), and is usually implemented by a card organization such as UnionPay, Visa, or Mastercard, or may be implemented by a card issuer such as a bank. In the system, a card issuing request, namely, a token service request, sent by a terminal is received, and virtual bank card data is sent to the terminal. The virtual bank card data includes a token (namely, a virtual card number of a virtual bank card installed in an eSE in this embodiment of this application) and token-related data such as a card key. The card key is used to prove validity of the card to a transaction processing terminal (such as a PoS terminal). In addition, the TSP further provides a service number and a service credential.

The second server 14 is a server corresponding to a payment application, such as a server corresponding to a wallet service provided by each of major mobile phone manufacturers, or may be a cloud server provided by each of major mobile phone manufacturers (a provided cloud service includes a wallet service). After entering a user name and verification information on the terminal, the user can log in to the second server, and can manage a status of the payment application (namely, a wallet) by using the second server, for example, lock the wallet or clear wallet data. In this embodiment of this application, the second server may further provide an identity credential for the terminal, to prove that an account that has been verified by the server is successfully logged in to for the wallet application.

The wireless communications network 15 is a network that provides a wireless communication function. Different communications technologies may be used for the wireless communications network, for example, Code Division Multiple Access (code division multiple access, CDMA), Wideband Code Division Multiple Access (wideband code division multiple access, WCDMA), Time Division Multiple Access (time division multiple access, TDMA), Frequency Division Multiple Access (frequency division multiple access, FDMA), orthogonal frequency-division multiple access (orthogonal frequency-division multiple access, OFDMA), single carrier frequency division multiple access (single carrier FDMA, SC-FDMA), and carrier sense multiple access with collision avoidance (carrier sense multiple access with collision avoidance). Based on factors such as capacities, rates, and delays of different networks, networks may be classified into a 2G (generation) network, a 3G network, and a 4G network. A typical 2G network includes a Global System for Mobile Communications (global system for mobile communications/general packet radio service, GSM) network or a general packet radio service (general packet radio service, GPRS) network. A typical 3G network includes a Universal Mobile Telecommunications System (universal mobile telecommunications system, UMTS) network. A typical 4G network includes a Long Term Evolution (long term evolution, LTE) network. The UMTS network sometimes may also be referred to as a universal terrestrial radio access network (universal terrestrial radio access network, UTRAN), and the ELE network sometimes may also be referred to as an evolved universal terrestrial radio access network (evolved universal terrestrial radio access network, E-UTRAN). Based on different resource allocation manners, networks may be classified into a cellular communications network and a wireless local area network (wireless local area networks, WLAN). The cellular communications network is based on scheduling, and the WLAN is based on contention. All the foregoing 2G, 3G and 4G networks are cellular communications networks. A person skilled in the art should know that, with development of technologies, the technical solutions provided in the embodiments of the present invention may also be applied to other wireless communications networks such as a 4.5G network and a 5G network, or other non-cellular communications networks. For brevity, in the embodiments of the present invention, the wireless communications network sometimes is briefly referred to as a network.

Figure 3:
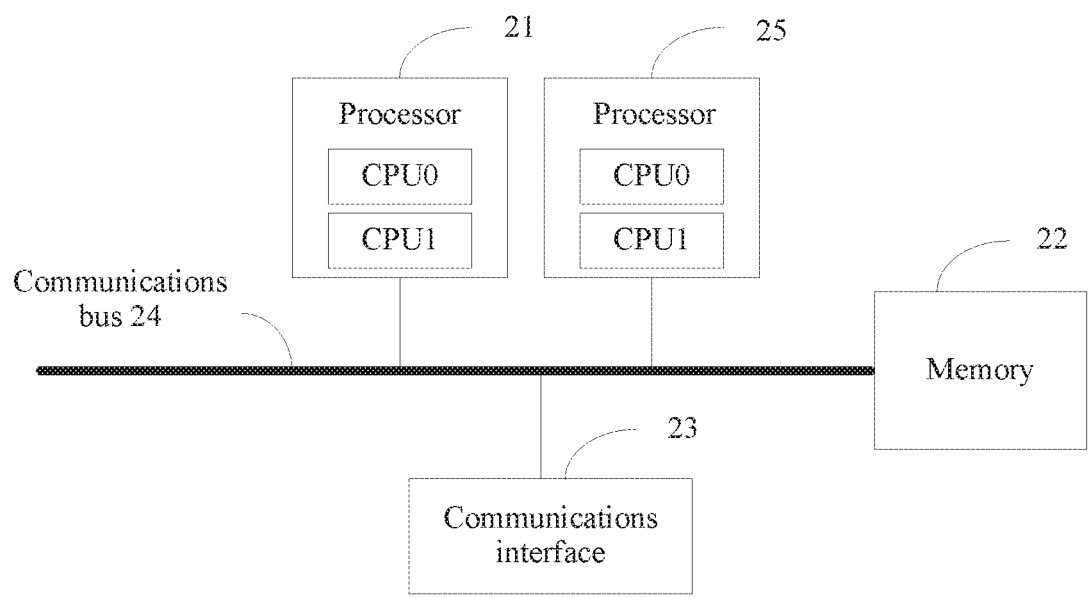
FIG. 3 is a schematic composition diagram of a server according to an embodiment of the present invention.

FIG. 3 is a schematic composition diagram of a server according to an embodiment of the present invention. The first server 13 and the second server 14 in FIG. 2 may be implemented by the server in FIG. 3. As shown in FIG. 3, the server may include at least one processor 21, a memory 22, a communications interface 23, and a communications bus 24.

The following describes all constituent parts of the server in detail with reference to FIG. 3.

The processor 21 is a control center of the server, and may be one processor or a collective term of a plurality of processing elements. For example, the processor 21 is a central processing unit (Central Processing Unit, CPU), or may be an application-specific integrated circuit (Application Specific Integrated Circuit, ASIC), or may be one or more integrated circuits configured to implement this embodiment of the present invention, for example, one or more microprocessors (Digital Signal Processor, DSP) or one or more field programmable gate arrays (Field Programmable Gate Array, FPGA).

The processor 21 may perform various functions of the server by running or executing a software program stored in the memory 22 and by invoking data stored in the memory 22.

In specific implementation, in an embodiment, the processor 21 may include one or more CPUs, for example, a CPU0 and a CPU1 shown in FIG. 3.

In specific implementation, in an embodiment, the server may include a plurality of processors, for example, the processor 21 and a processor 25 shown in FIG. 3. Each of these processors may be a single-core processor (single-CPU) or a multi-core processor (multi-CPU). The processor herein may be one or more devices, circuits, and/or processing cores configured to process data (such as a computer program instruction).

The memory 22 may be a read-only memory (Read-only Memory, ROM) or another type of static storage device that can store static information and instructions, or a random access memory (Random Access Memory, RAM) or another type of dynamic storage device that can store information and instructions; or may be an electrically erasable programmable read-only memory (Electrically Erasable Programmable Read-Only Memory, EEPROM), a compact disc read-only memory (Compact Disc Read-Only Memory, CD-ROM) or other compact disc storage, optical disc storage (including a compact disc, a laser disc, an optical disc, a digital versatile disc, a Blu-ray disc, or the like), a magnetic disk storage medium or another magnetic storage device, or any other medium that can be used to carry or store expected program code in an instruction or data structure form and that can be accessed by a computer. However, no limitation is imposed herein. The memory 22 may exist independently, and is connected to the processor 21 by using the communications bus 24. Alternatively, the memory 22 may be integrated with the processor 21.

The memory 22 is configured to store a software program for executing the solutions in the present invention, and the software program is controlled by the processor 21 for execution.

The communications interface 23 may be any apparatus of a transceiver type, and is configured to communicate with another device or communications network, such as the Ethernet, a radio access network (radio access network, RAN), or a wireless local area network (Wireless Local Area Networks, WLAN). The communications interface 23 may include a receiving unit for implementing a receiving function, and a sending unit for implementing a sending function.

The communications bus 24 may be an Industry Standard Architecture (Industry Standard Architecture, ISA) bus, a Peripheral Component Interconnect (Peripheral Component, PCI) bus, an Extended Industry Standard Architecture (Extended Industry Standard Architecture, EISA) bus, or the like. The bus may be classified into an address bus, a data bus, a control bus, and the like. For ease of representation, the bus is represented by only one thick line in FIG. 3, but it does not indicate that there is only one bus or one type of bus.

The structure of the device shown in FIG. 3 imposes no limitation on the server. The server may include components more or fewer than those shown in the figure, combine some components, or have different component arrangements.

Figure 4:
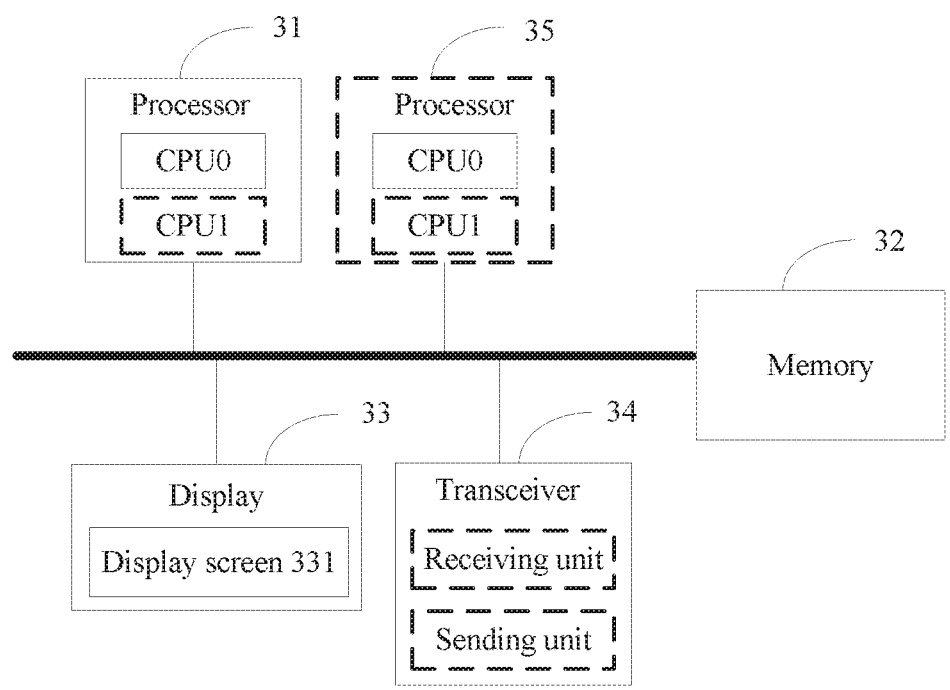
FIG. 4 is a schematic composition diagram of a terminal according to an embodiment of the present invention.

FIG. 4 is a schematic composition diagram of a terminal according to an embodiment of the present invention. The first terminal 11 and the second terminal 12 in FIG. 2 may be implemented by the terminal in FIG. 4. As shown in FIG. 4, the terminal may include at least one processor 31, a memory 32, a display 33, and a transceiver 34.

The following describes all constituent parts of the terminal in detail with reference to FIG. 4.

The processor 31 is a control center of the terminal, and may be one processor or a collective term of a plurality of processing elements. For example, the processor 31 is a CPU, or may be an ASIC, or may be one or more integrated circuits configured to implement this embodiment of the present invention, for example, one or more DSPs or one or more FPGAs. The processor 31 may perform various functions of the terminal by running or executing a software program stored in the memory 32 and by invoking data stored in the memory 32. The processor 31 in this embodiment of this application runs in a TEE environment.

In specific implementation, in an embodiment, the processor 31 may include one or more CPUs, for example, a CPU0 and a CPU1 shown in FIG. 4.

In specific implementation, in an embodiment, the terminal may include a plurality of processors, for example, the processor 31 and a processor 35 shown in FIG. 4. Each of these processors may be a single-CPU processor or a multi-CPU processor. The processor herein may be one or more devices, circuits, and/or processing cores configured to process data (such as a computer program instruction).

The memory 32 may be a ROM or another type of static storage device that can store static information and instructions, or a RAM or another type of dynamic storage device that can store information and instructions; or may be an EEPROM, a CD-ROM or other compact disc storage, optical disc storage including a compact disc, a laser disc, an optical disc, a digital versatile disc, a Blu-ray disc, or the like), a magnetic disk storage medium or another magnetic storage device, or any other medium that can be used to carry or store expected program code in an instruction or data structure form and that can be accessed by a computer. However, no limitation is imposed herein. The memory 32 may exist independently, and is connected to the processor 31 by using the communications bus 34. Alternatively, the memory 32 may be integrated with the processor 31. The memory 32 is configured to store a software program for executing the solutions in the present invention, and the software program is controlled by the processor 31 for execution. The memory 32 in this embodiment of this application is a memory in the TEE environment.

The display 33 may be configured to display information entered by a user or information provided for a user, and various menus of the terminal. The display 33 may include a display screen 331. Optionally, the display screen 331 may be configured by using a liquid crystal display (Liquid Crystal Display, LCD), an organic light-emitting diode (Organic Light-Emitting Diode, OLED), or the like.

The transceiver 34 may be any apparatus of a transceiver type, and is configured to communicate with another device or communications network, such as the Ethernet, a RAN, or a WLAN. The transceiver 34 may include a receiving unit for implementing a receiving function, and a sending unit for implementing a sending function.

The structure of the device shown in FIG. 4 imposes no limitation on the terminal. The terminal may include components more or fewer than those shown in the figure, combine some components, or have different component arrangements. Although not shown, the terminal may further include a battery, a camera, a Bluetooth module, a Global Positioning System (Global Positioning System, GPS) module, an NEC module, an SE module, and the like. Details are not described herein.

In this embodiment of the present invention, specific functions of all modules of the first terminal are as follows.

The transceiver 34 is configured to receive a bank card adding request. The display 33 is configured to display at least a first option and a second option on a display screen of the first terminal. The first option is: entering a bank card number, scanning a bank card, or reading a number through card tapping. The second option is: obtaining bank card data from another terminal. The display 33 is further configured to: display an identifier of at least one of the other terminals under the second option; or display an identifier of at least one of the other terminals after the first terminal receives selection of a user for the second option. The another terminal includes the second terminal. The another terminal and the first terminal loci in to a same account (a same payment application account or a same cloud service account). The processor 31 is configured to establish a peer-to-peer wireless communication connection to the second terminal. The transceiver 34 is further configured to send a request for obtaining bank card data to the second terminal. The transceiver 34 is further configured to receive the bank card data sent by the second terminal. The processor 31 is configured to obtain bank card account information in a protected operating environment based on the bank card data. The protected operating environment may be a TEE or an SE. The transceiver 34 is further configured to send a card issuing request to a first server, to add a bank card to the first terminal, where the card issuing request includes the bank card account information.

The transceiver 34 is specifically configured to send a verification credential and/or a first terminal certificate to the second terminal through the peer-to-peer wireless communication connection, where the verification credential includes a service credential and an identity credential, the first terminal certificate is a terminal certificate preconfigured in the protected operating environment of the first terminal, the service credential is used to prove that a service in which the first terminal obtains the bank card data is valid, and the identity credential is used to prove that a login account in the first terminal is valid.

The transceiver 34 is specifically configured to receive first encrypted data sent by the second terminal, where the first encrypted data includes first encrypted bank card data, an identifier of an image processing algorithm, and a parameter used in the image processing algorithm that are encrypted by using a public key of the first terminal and that are signed by using a private key of the second terminal, the first encrypted bank card data includes a bank card account information image, the bank card account information image includes the bank card account information, and the bank card account information is used to identify the bank card. Alternatively, the first terminal receives second encrypted data sent by the second terminal, where the second encrypted data includes to-be-migrated data that is encrypted by using a public key of the first terminal and that is signed by using a private key of the second terminal, and the to-be-migrated data includes a BIN and the last four digits of a PAN.

The processor 31 is specifically configured to: perform, in the TEE of the first terminal by using a public key of the second terminal, verification on a signature generated by using the private key of the second terminal, and decrypt the first encrypted data by using a private key of the first terminal, to obtain the first encrypted bank card data, the identifier of the image processing algorithm, and the parameter used in the image processing algorithm. The first terminal decrypts, in the TEE of the first terminal, the first encrypted bank card data based on the image processing algorithm corresponding to the identifier of the image processing algorithm and the parameter used in the image processing algorithm, to obtain the bank card account information image. The first terminal recognizes, in the TEE of the first terminal, the bank card account information image by using an OCR algorithm, to obtain the bank card account information.

The processor 31 is specifically configured to: perform, in the TEE of the first terminal by using a public key of the second terminal, verification on a signature generated by using the private key of the second terminal, and decrypt the second encrypted data by using a private key of the first terminal, to obtain the to-be-migrated data. The first terminal sends, to the first server, the first terminal certificate, the to-be-migrated data, and the signature generated by the second terminal for the to-be-migrated data. The first terminal receives the bank card account information sent by the first server.

The transceiver 34 is further configured to obtain the service credential from the first server, where the service credential includes a service number and a signature generated by the first server for the service number. The memory 32 is configured to store the service credential into the TEE of the first terminal.

The transceiver 34 is further configured to send the service number to a second server by using a same account as that of the second terminal.

The transceiver 34 is further configured to receive the identity credential sent by the second server, where the identity credential includes the service number and a signature generated by the second server for the service number.

The memory 32 is further configured to store the identity credential into the TEE of the first terminal.

The transceiver 34 is further configured to: send a first deregistration message to the first server, where the first deregistration message is used to instruct the first server to deregister the service credential; and/or send a second deregistration message to the second server, where the second deregistration message is used to instruct the second server to deregister the identity credential.

In this embodiment of the present invention, specific functions of all modules of the second terminal are as follows.

The transceiver 34 is configured to receive a request that is for obtaining bank card data and that is sent by the first terminal. The transceiver 34 is further configured to send the bank card data to the first terminal.

The transceiver 34 is further configured to receive a bank card adding request. The processor 31 is further configured to obtain a bank card account information image based on the bank card adding request. The processor 31 is further configured to perform image encryption processing on the bank card account information image based on an image processing algorithm, to obtain first encrypted bank card data. The processor 31 is further configured to encrypt the first encrypted bank card data by using a public key of the second terminal, to obtain second encrypted bank card data. The processor 31 is further configured to set an access password for the second encrypted bank card data, to obtain first backup data. The memory 32 is configured to: store the first backup data into a TEE of the second terminal, and store, into an eSE, an identifier of the image processing algorithm and a parameter used in the image processing algorithm.

The transceiver 34 is further configured to receive a bank card adding request. The processor 31 is further configured to obtain to-be-migrated data based on the bank card adding request, where the to-be-migrated data includes a BIN and the last four digits of a PAN. The processor 31 is further configured to encrypt the to-be-migrated data based on a public key of the second terminal, to obtain second backup data. The memory 32 is further configured to store the second backup data into a TEE of the second terminal. The transceiver 34 is further configured to send a buffer request to a first server, where the buffer request includes the last four digits of the PAN and a second terminal certificate, and the buffer request is used to request the first server to associate bank card account information related to the last four digits of the PAN with the second terminal certificate.

Figure 5:
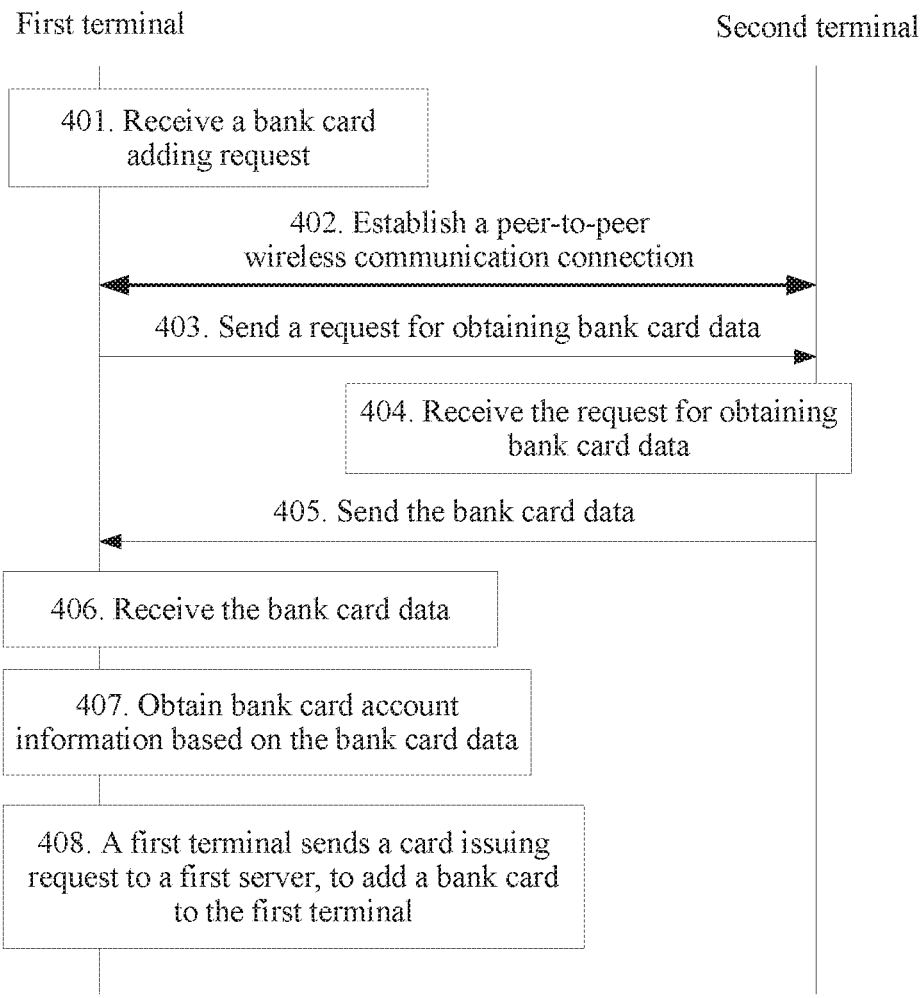
FIG. 5 is a flowchart of a bank card adding method according to an embodiment of the present invention.

FIG. 5 is a flowchart of a bank card adding method according to an embodiment of the present invention. The method is applied to a first terminal that has a TEE. As shown in FIG. 5, the method specifically includes the following steps.

401. The first terminal receives a bank card adding request.

A user first enables an NFC function of the first terminal: The user taps "NIT" in a "wireless and networks" setting interface to display an NFC control interface, and after the NFC control interface is displayed, the user enables the NFC function, and also enables a function of a built-in security chip of NFC. Then, the user taps an icon of a payment application on a home screen of the first terminal, to log in to an account of the payment application and display a user interface of the payment application. The user taps "Bank cards" to display a card adding interface. The user taps "Add", and a display screen of the first terminal prompts the user with an option of a type of a card that needs to be added. The user chooses to add a bank card (a credit card or a debit card), and the first terminal receives the bank card adding request.

Figure 6:
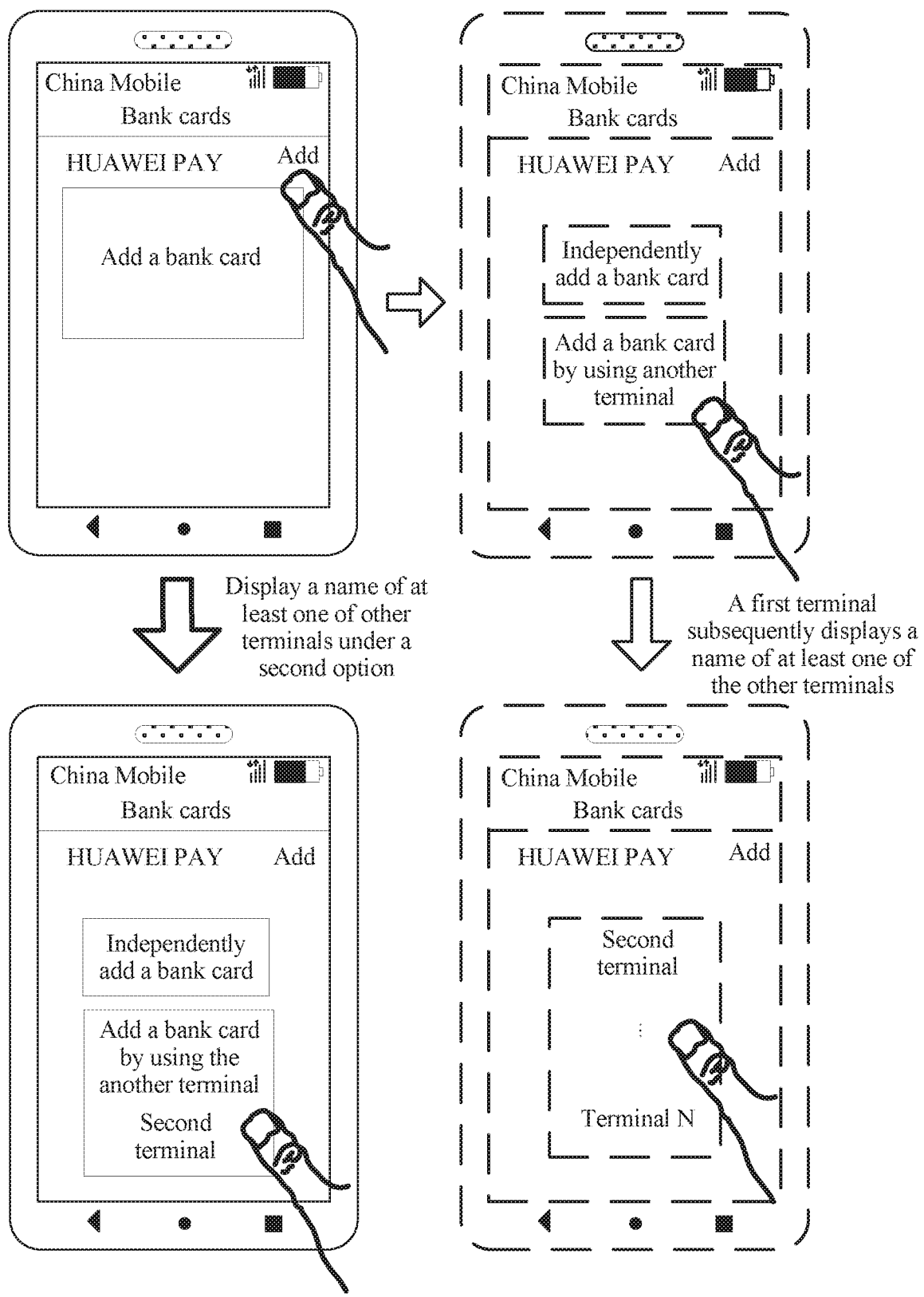
FIG. 6 is a schematic diagram of displaying an interface of a first terminal according to an embodiment of the present invention.

After receiving the bank card adding request, the first terminal displays at least a first option and a second option on the display screen of the first terminal. The first option is: entering a bank card number, scanning a bank card, or reading a number through card tapping, and the second option is: obtaining bank card data from another terminal. For example, FIG. 6 is a schematic diagram of displaying an interface of the first terminal according to an embodiment of this application. The first option and the second option are displayed on the display screen of the first terminal, and the user may perform selection based on a requirement of the user. If the user adds a bank card to the first terminal for the first time, the user may select the first option. If the user has previously added a bank card to another terminal, the user may select the second option, to obtain bank card data from the another terminal. Further, an identifier of at least one of the other terminals is displayed under the second option.

Optionally, the first terminal displays an identifier of at least one of the other terminals after the first terminal receives selection of the user for the second option. The another terminal includes a second terminal. The another terminal and the first terminal log in to a same payment application account or a same cloud service account. The first terminal may use a trusted user interface (Trusted User Interface, TUI) to present the first option and the second option and an input interface corresponding to the first option and the second option.

402. The first terminal establishes a peer-to-peer wireless communication connection to a second terminal.

After the first terminal receives the bank card adding request and the user selects the option of adding a bank card by using the another terminal, the first terminal establishes the peer-to-peer wireless communication connection to the second terminal.

403. The first terminal sends a request for obtaining bank card data to the second terminal.

After establishing the peer-to-peer wireless communication connection to the second terminal, the first terminal sends the request for obtaining bank card data to the second terminal.

It should be noted that the first terminal ay first obtain a verification credential and a first terminal certificate before sending the request for obtaining bank card data to the second terminal. The verification credential may include a service credential and an identity credential. For example, the first terminal first obtains the service credential from a first server, where the service credential includes a service number and a signature generated by the first server for the service number, and the service credential is used to prove that a service in which the first terminal obtains the bank card data is valid. Then, the first terminal sends the service number to a second server by using a same account as that of the second terminal, and the first terminal receives the identity credential sent by the second server. The identity credential includes the service number and a signature generated by the second server for the service number, and the identity credential is used to prove that a login account in the first terminal is valid. The first terminal stores the identity credential into the TEE of the first terminal, and the first terminal stores the service credential into the TEE of the first terminal. The first terminal certificate is a terminal certificate preconfigured in the TEE of the first terminal. The request for obtaining bank card data includes the verification credential and/or the first terminal certificate.

404. The second terminal receives the request that is for obtaining bank card data and that is sent by the first terminal.

After the first terminal sends the request for obtaining bank card data to the second terminal, the second terminal receives the request that is for obtaining bank card data and that is sent by the first terminal.

405. The second terminal sends the bank card data to the first terminal.

After the second terminal receives the request that is for obtaining bank card data and that is sent by the first terminal, the second terminal sends the bank card data to the first terminal.

It should be noted that, before sending the bank card data to the first terminal, the second terminal needs to perform verification on the verification credential and/or the first terminal certificate. If the verification credential and/or the first terminal certificate have/has been verified by the second terminal, the second terminal generates first encrypted data or second encrypted data. The first encrypted data includes first encrypted bank card data, an identifier of an image processing algorithm, and a parameter used in the image processing algorithm that are encrypted by using a public key of the first terminal and that are signed by using a private key of the second terminal. The first encrypted bank card data includes one or more bank card account information images selected by the user. The bank card account information image includes bank card account information. The bank card account information is used to identify a bank card. The second encrypted data includes to-be-migrated data that is encrypted by using a public key of the first terminal and that is signed by using a private key of the second terminal. The to-be-migrated data includes a BIN and the last four digits of a PAN of at least one bank card, where the BIN is used to identify a bank. Further, before the second terminal sends the bank card data to the first terminal, a user interface may be provided to prompt the user to select one or more bank cards that have been bound to the second terminal for migration, and the user selection is received. The bank card data includes the first encrypted data or the second encrypted data.

406. The first terminal receives the bank card data sent by the second terminal.

After the second terminal sends the bank card data to the first terminal, the first terminal receives the bank card data sent by the second terminal.

407. The first terminal obtains bank card account information based on the bank card data.

After the first terminal receives the bank card data sent by the second terminal, when the bank card data includes the first encrypted data, the first terminal performs, in a protected operating environment such as the TEE by using a public key of the second terminal, verification on a signature generated by using the private key of the second terminal, and decrypts the first encrypted data by using a private key of the first terminal, to obtain the first encrypted bank card data, the identifier of the image processing algorithm, and the parameter used in the image processing algorithm. The first terminal decrypts, in the TEE of the first terminal, the first encrypted bank card data based on the image processing algorithm corresponding to the identifier of the image processing algorithm and the parameter used in the image processing algorithm, to obtain the bank card account information image. The first terminal processes the bank card account information image by using an OCR algorithm, to obtain the bank card account information.

After the first terminal receives the bank card data sent by the second terminal, when the bank card data includes the second encrypted data, the first terminal performs, in a protected operating environment by using a public key of the second terminal, verification on a signature generated by using the private key of the second terminal, and decrypts the second encrypted data by using a private key of the first terminal, to obtain the to-be-migrated data. The first terminal sends, to the first server, the first terminal certificate, the to-be-migrated data, and the signature generated by the second terminal for the to-be-migrated data. The first terminal receives the bank card account information sent by the first server.

408. The first terminal sends a card issuing request to a first server, to add a bank card to the first terminal.

After obtaining the bank card account information based on the bank card data, the first terminal sends the card issuing request to the first server, to add the bank card to the first terminal, where the card issuing request includes the bank card account information.

In this embodiment of this application, the first terminal obtains the bank card data of the related bank card account information from the second terminal through the peer-to-peer wireless communication connection to the second terminal, and binds a physical bank card to the first terminal by using the bank card data, to generate a virtual bank card. Therefore, the user does not need to enter the bank card account information on the first terminal in a non-automatic manner to perform card issuing, so that user operation steps are simplified, and user experience is effectively improved.

Figure 7A:
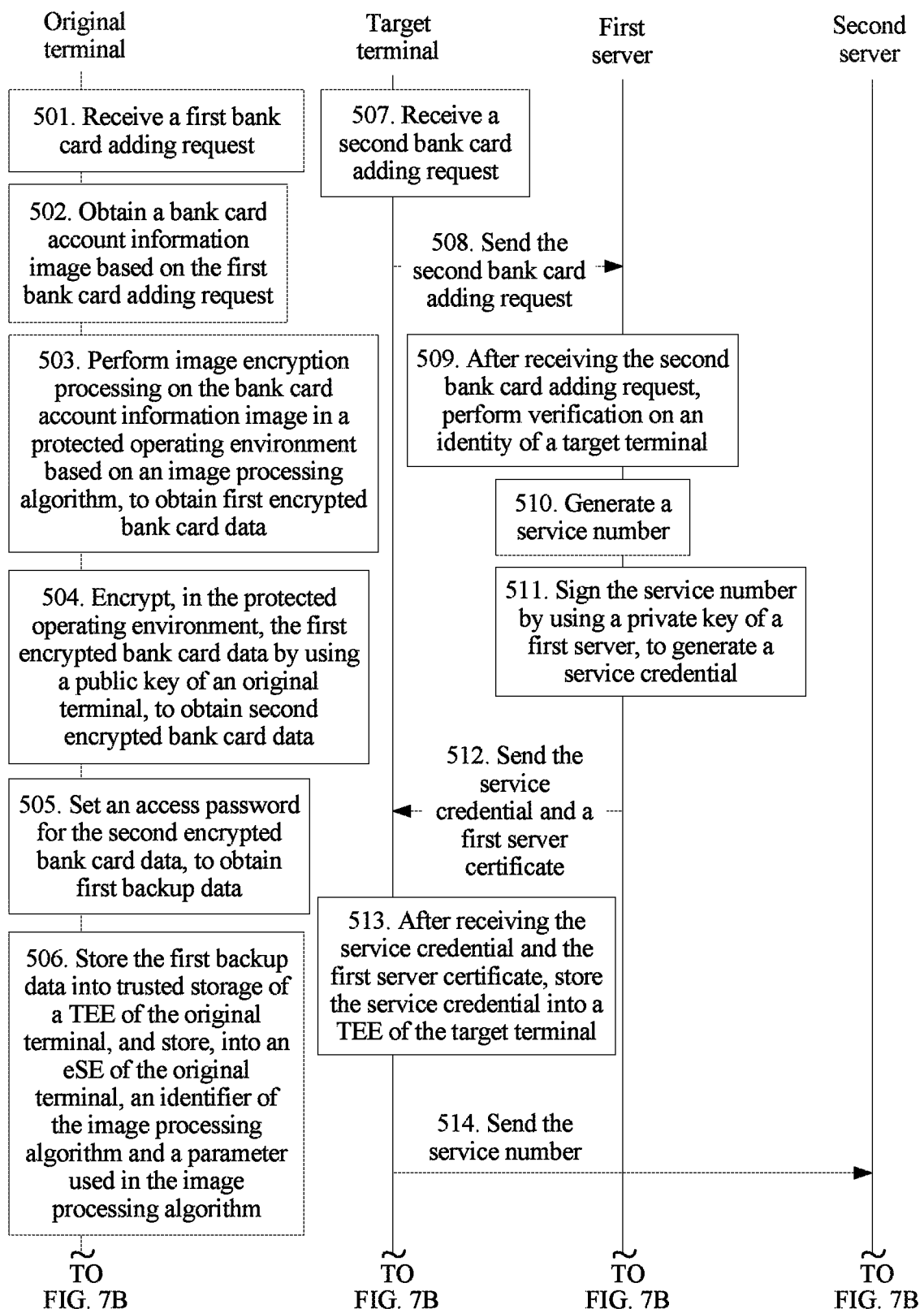
FIG. 7A, FIG. 7B, and FIG. 7C are a flowchart of a bank card adding method according to an embodiment of the present invention.
Figure 7B:
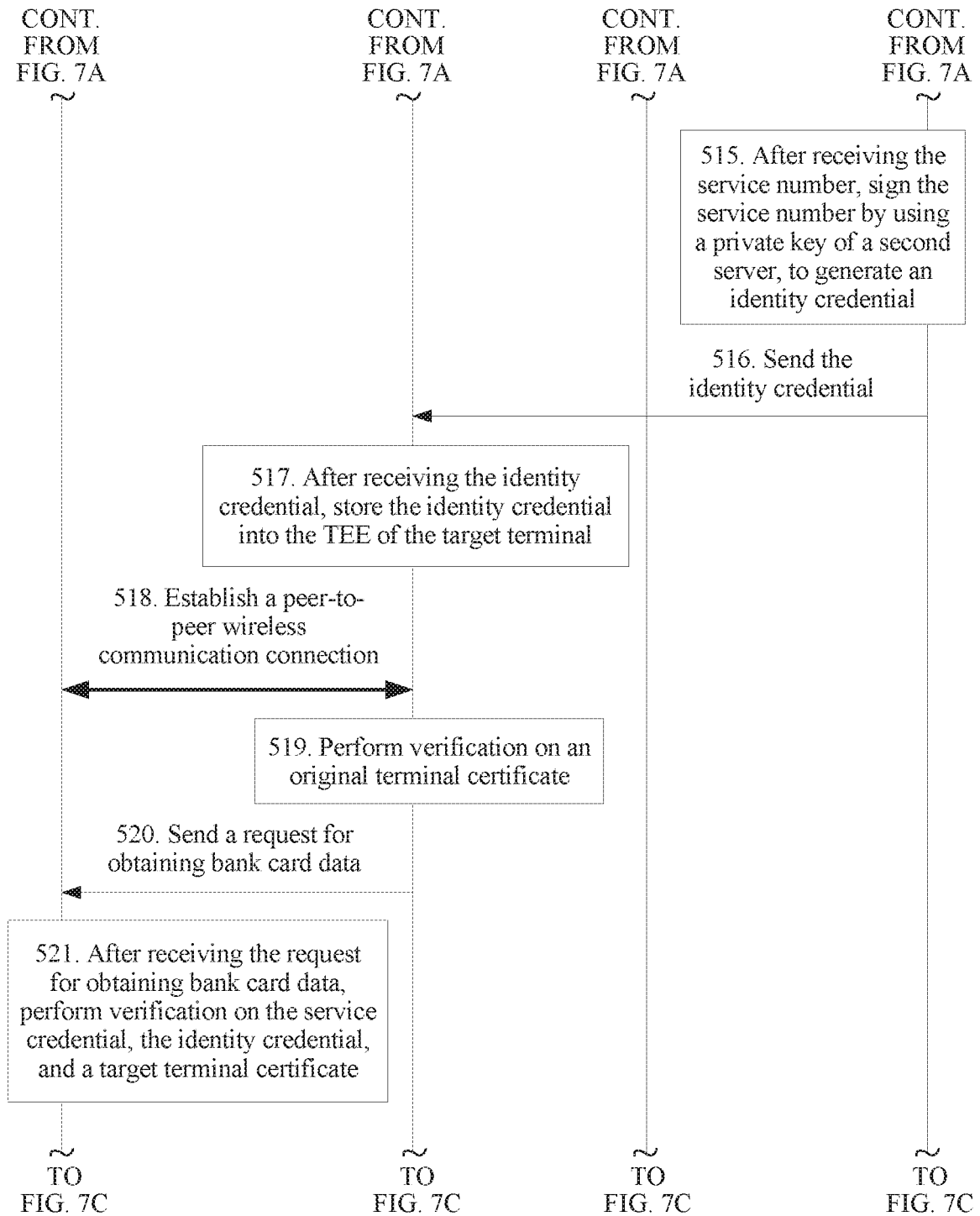
Figure 7C:
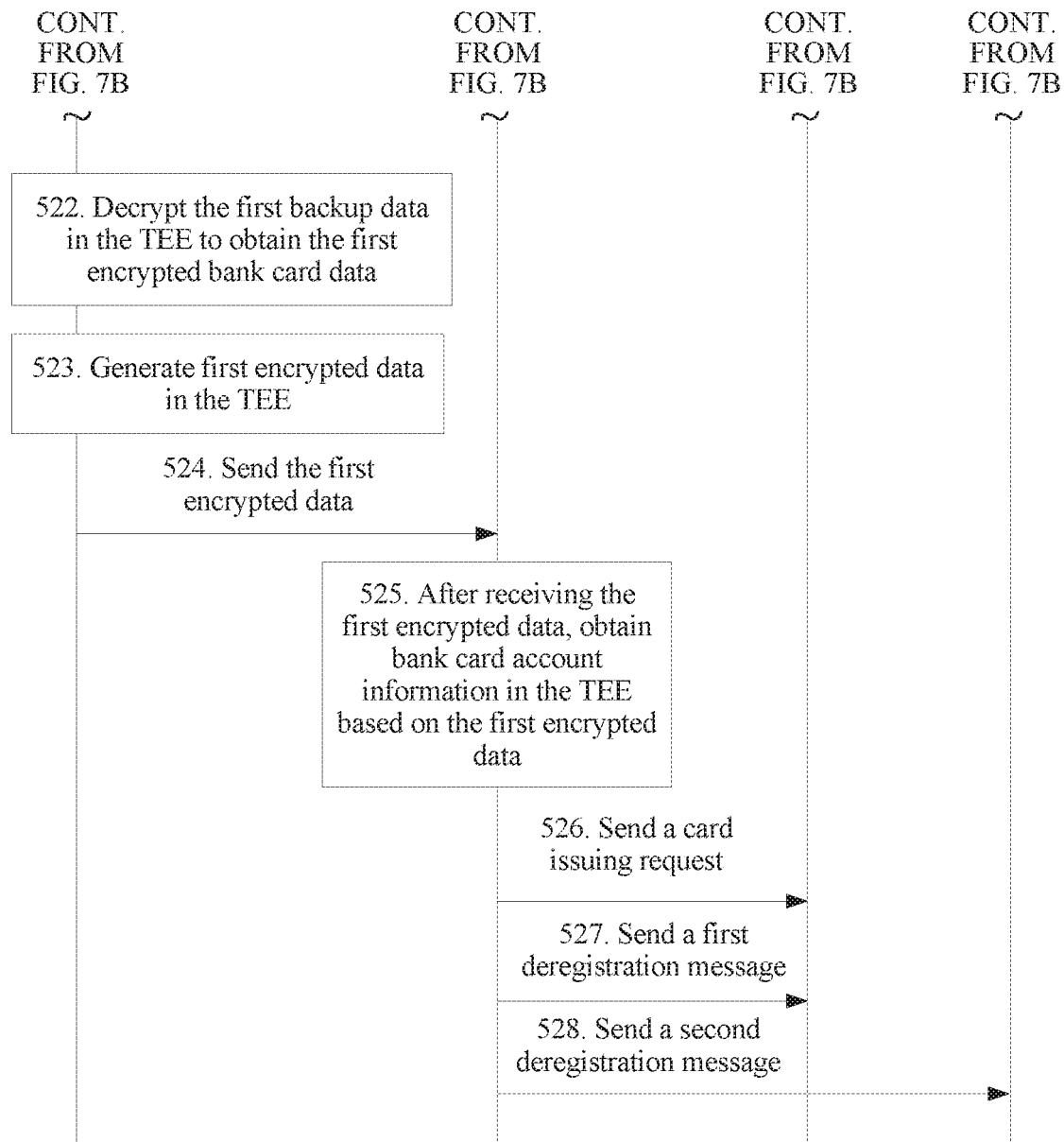

FIG. 7A, FIG. 7B, and FIG. 7C are a flowchart of a bank card adding method according to an embodiment of the present invention. This embodiment details the case in which bank card data includes first encrypted data in FIG. 5. It is assumed that a first terminal is a target terminal, namely, a terminal on which no virtual bank card is issued, and a second terminal is an original terminal, namely, a terminal on which several virtual bank cards have been issued. The original terminal pre-stores first backup data, and the target terminal obtains the first backup data from the original terminal. As shown in FIG. 7A, FIG. 7B, and FIG. 7C, the method specifically includes the following steps.

501. The original terminal receives a first bank card adding request.

For details, refer to detailed descriptions in step 401. Details are not described herein again. The first bank card adding request is used to instruct to add a bank card to a payment application. A user can fill in information based on guidance to complete operations of adding a bank card and generating a virtual bank card in the terminal.

502. The original terminal obtains a bank card account information image based on the first bank card adding request.

After receiving the first bank card adding request, the original terminal obtains the bank card account information image based on the first bank card adding request. The bank card account information image includes a front image of a physical bank card, or a front image of a physical bank card and a rear image of the physical bank card. Both the front image of the physical bank card and the rear image of the physical bank card include bank card account information. For example, for a credit card, the front image of the physical bank card includes an image of a primary account number and a validity period, and the rear image of the physical bank card includes an image of a CVV. In this scenario, the original terminal needs to obtain the front image of the physical bank card and the rear image of the physical bank card. The bank card account information image obtained by the original terminal includes the front image of the physical bank card and the rear image of the physical bank card. For a deposit card, the front image of the physical bank card includes an image of a primary account number. In this scenario, the original terminal needs to obtain only the front image of the physical bank card. The bank card account information image obtained by the original terminal includes the front image of the physical bank card.

The original terminal may prompt the user by displaying "scan for input", "read a number through card tapping", and "manual input" in a user interface (User Interface, UI). The user selects "scan for input", "read a number through card tapping", or "manual input", so that the original terminal obtains the bank card account information. In this embodiment of this application, the bank card account information is obtained preferably in a manner of "scan for input".

Figure 1:
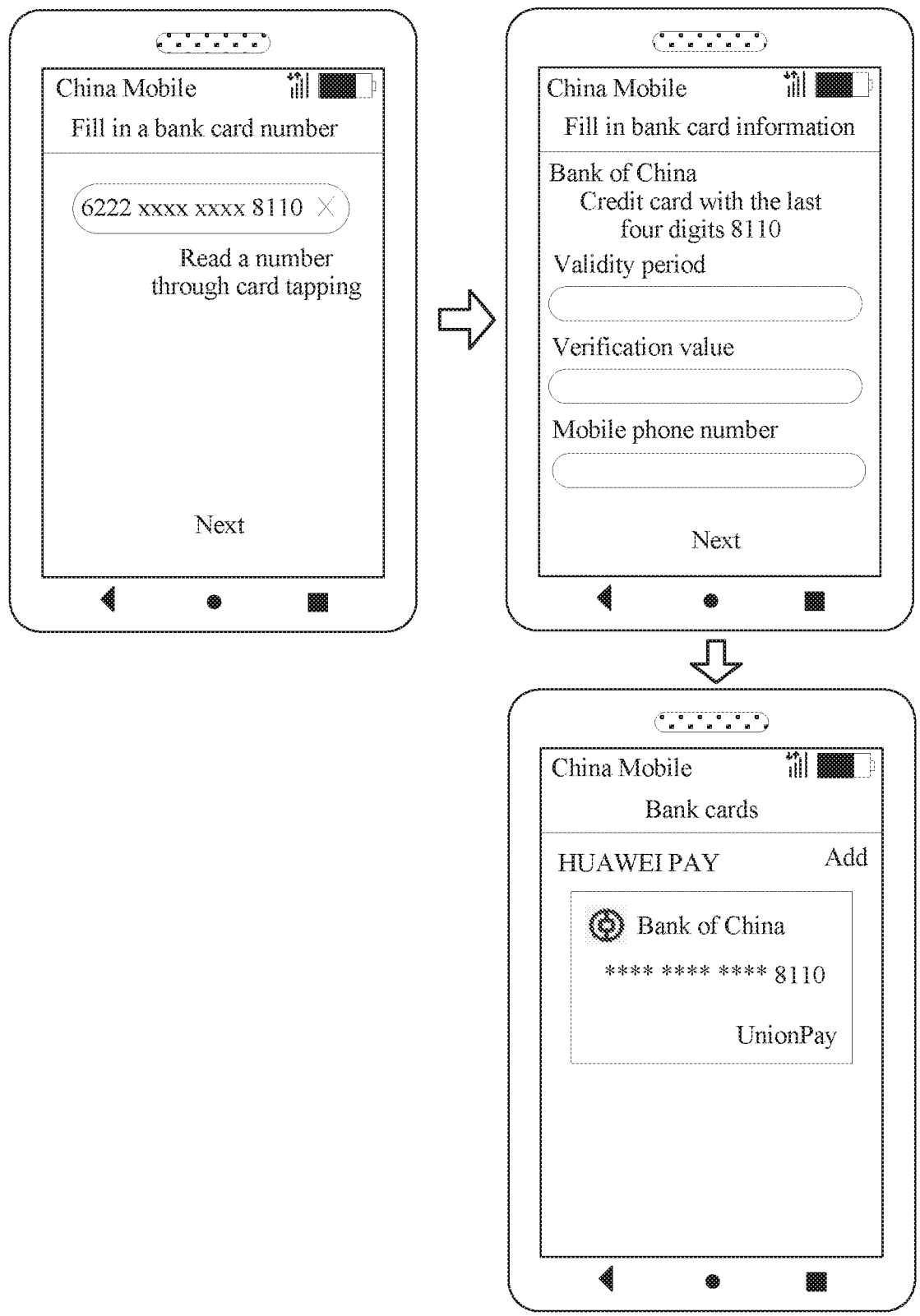
FIG. 1 is a schematic diagram of a process of binding a physical bank card to a terminal to generate a virtual bank card in the prior art.

Specifically, after receiving a "scan for input" request, the original terminal starts a camera driver controlled by a TEE, to start a camera of the terminal, and uses the camera to scan a front side of the physical bank card and a rear side of the physical bank card. It should be noted that if the original terminal is not provided with a prompt function such as "scan for input" and "manual input", and it is directly set that the bank card account information image is obtained by scanning the physical bank card, the original terminal receives the first bank card adding request and then directly starts the camera driver controlled by the TEE, to start the camera of the terminal and scan the front side of the physical bank card and the rear side of the physical bank card by using the camera. Then, the original terminal starts an OCR algorithm; uses the OCR algorithm to recognize the front image of the physical bank card and the rear image of the physical bank card, to obtain the bank card account information such as the primary account number; presents the bank card account information to the user by using a TUI; and may prompt the user to confirm whether the bank card account information is correct and whether to store the bank card account information. If the bank card account information is correct, the user may tap "OK" and/or "save" in the user interface. It should be noted that, in terms of a visual effect, the TUI may be consistent with that shown in FIG. 1, but a difference is as follows: The TUI is implemented based on a software environment provided by the TEE, but an interface for filling in a bank card in the prior art in FIG. 1 is a graphical user interface (Graphical User Interface, GUI) and is an interface provided by an untrusted environment.

Alternatively, the original terminal may obtain the bank card account information by using the primary account number that is manually entered by the user in a user interface for filling in the bank card account information, by reading a number through card tapping, or the like. The original terminal may convert the obtained bank card account information into an image to obtain the bank card account information image. It should be noted that a preset algorithm may be used, for example, an image whose background has a color, a texture, and a fixed size is preset. The bank card account information is displayed on the preset image after being processed, and then is synthesized into an image that includes digital information, namely, the bank card account information image.

503. The original terminal performs image encryption processing on the bank card account information image in a protected operating environment based on an image processing algorithm, to obtain first encrypted bank card data.

After obtaining the bank card account information image based on the first bank card adding request, the original terminal performs image encryption processing on the bank card account information image based on the image processing algorithm, to obtain the first encrypted bank card data. The original terminal performs image encryption processing on the bank card account information image based on the image processing algorithm, so that the bank card account information such as the primary account number, the validity period, and the Card Verification Value presented by the front image of the physical bank card and the rear image of the physical bank card cannot be recognized by human eyes or the OCR algorithm. It should be noted that the image processing algorithm may be used to randomly disrupt each row for digital image encryption, randomly disrupt each column for digital image encryption, disrupt both each row and each column for encryption, randomly disrupt pixels for encryption, use a chaotic sequence for digital image encryption, and the like. For the digital processing algorithm, refer to the book of Image Encryption Algorithms and Practices (a standard book number is 978-7-03-037670-1). In the encryption process, an input interface may be displayed by using the TUI, so that the user enters or selects an encryption parameter.

504. The original terminal encrypts, in the protected operating environment, the first encrypted bank card data by using a public key of the original terminal, to obtain second encrypted bank card data.

After performing image encryption processing on the bank card account information image based on the image processing algorithm, to obtain the first encrypted bank card data, the original terminal encrypts the first encrypted bank card data by using the public key of the original terminal, to obtain the second encrypted bank card data.

It should be noted that a public key (Public Key) and a private key (Private Key) are a key pair, namely, one public key and one private key, obtained by using an algorithm. In the key pair, the public key is public, and the private key is not public. The public key is usually used to encrypt a session key, perform verification on a digital signature, or encrypt data that can be decrypted by using a corresponding private key. It can be ensured that the key pair obtained by using the algorithm is unique worldwide. If one key in the key pair is used to encrypt a segment of data, the other key needs to be used for decryption. For example, if the public key is used to encrypt data, the private key needs to be used for decryption if the private key is used for encryption, the public key needs to be used for decryption. Otherwise, decryption does not succeed. The public key of the original terminal is a public key included in a terminal certificate stored in the protected operating environment (such as trusted storage of the TEE) of the original terminal. Data encrypted by using the public key can be decrypted only by using a private key corresponding to the public key, and only the original terminal has the private key. Therefore, even if another entity obtains the data that is encrypted by the original terminal by using the public key, the another entity cannot decrypt the data due to lack of the private key of the original terminal.

505. The original terminal sets an access password for the second encrypted bank card data, to obtain first backup data.

After encrypting the first encrypted bank card data by using the public key of the original terminal, to obtain the second encrypted bank card data, the original terminal sets the access password for the second encrypted bank card data, to obtain the first backup data. The access password that is set by the original terminal for the second encrypted bank card data may be a personal identification number (Personal identification Number, PIN) or a fingerprint. The first backup data is the bank card account information image on which three levels of encryption are performed by using the image processing algorithm, the public key of the original terminal, and the access password.

506. The original terminal stores the first backup data into trusted storage of a TEE of the original terminal, and stores, into an eSE of the original terminal, an identifier of the image processing algorithm and a parameter used in the image processing algorithm.

After setting the access password for the second encrypted bank card data, to obtain the first backup data, the original terminal stores the first backup data into the trusted storage of the TEE of the original terminal, and stores, into the eSE of the original terminal, the identifier of the image processing algorithm and the parameter used in the image processing algorithm. Optionally, when the original terminal obtains the bank card account information and requests a first server to activate a bank card, and the first server performs verification on a cardholder, the user needs to enter a mobile phone number associated with the bank card. In this case, the entered mobile phone number may be encrypted by using the public key of the original terminal and then stored into the TEE. It should be noted that, the mobile phone number may be converted into an image and then stored into the TEE, or may be directly encrypted and then stored into the TEE.

Optionally, when obtaining the bank card account information through card scanning, the original terminal may first process the rear image of the physical bank card by using the image processing algorithm, encrypt the image by using the public key of the original terminal, store the image into the eSE, and set a PIN or a fingerprint access password, to obtain the first backup data. In this way, the first backup data may include the encrypted front image that is of the physical bank card and is stored in the TEE and the encrypted rear image that is of the physical bank card and is stored in the eSE. Because the rear image of the physical bank card includes the CVV, using the eSE to store the rear image may further improve security and prevent a risk caused by data theft.

Therefore, the original terminal can securely obtain the bank card account information; store, into the TEE or the TEE and the eSE of the original terminal, the first backup data that includes the bank card account information; and store, into the eSE, the identifier of the image processing algorithm and the parameter used in the image processing algorithm, so that the original terminal can securely store the first backup data. Even if the first backup data is exported, information in the first backup data cannot be restored due to lack of a decryption key. Steps 501 to 506 disclose a method for backing up bank card data for an NFC payment application. The method may be independently performed as a backup procedure, or may be performed as a part of a whole bank card adding process. No limitation is imposed in this embodiment of the present invention.

507. The target terminal receives a second bank card adding request.

For details, refer to detailed descriptions in step 401. Details are not described herein again.

508. The target terminal sends the second bank card adding request to a first server.

After receiving the second bank card adding request, the target terminal sends the second bank card adding request to the first server, so that the first server generates a service number and a service credential for the target terminal. The service credential includes the service number and a signature generated by the first server for the service number. The second bank card adding request includes a target terminal certificate. The service credential is used to prove that a service in which the target terminal obtains bank card data is valid.

509. After receiving the second bank card adding request, the first server performs verification on an identity of the target terminal.

The first server may obtain the target terminal certificate from the second bank card adding request, and then may perform verification on the target terminal certificate by using a root certificate of a certificate authority. The root certificate of the certificate authority may be preconfigured in the first server, or a root certificate that can be used to perform verification on a target terminal certificate chain is preconfigured in the first server.

It should be noted that a digital certificate is a certificate issued by an authoritative, trusted, and impartial third-party authority, namely, a certificate authority (Certificate Authority, CA), to a secure user, and is an authoritative electronic document. The digital certificate is also referred to as a "digital identity card". Content of the certificate includes information about a certificate issuing authority, user information, a validity period of the digital certificate, a user public key, a signature of the certificate issuing authority, and the like. A simplest certificate includes a public key, a digital certificate name, and a digital signature of the certificate authority. The digital signature means using a cryptographic algorithm to perform encryption processing on data, adding the encrypted data to an original text, and then sending an original text to which the data has been added. This segment of information is similar to a real signature or seal, and a receiving party can perform verification on the segment of information. The digital certificate is valid only within a specific time period. The digital certificate is used to prove that a user listed in the certificate legally owns a public key listed in the certificate. A digital certificate issuing process is usually as follows: A user first generates a key pair of the user, and sends a public key and partial personal identity information to the certificate authority. After an identity has been verified by the certificate authority, the certificate authority performs some necessary steps to ensure that a request is sent by the user indeed. Then, the certificate authority issues a digital certificate to the user. The certificate includes personal information of the user and public key information of the user, and also includes signature information of the certificate authority. In this case, the user can use the digital certificate of the user to perform various related activities. The digital certificate is issued by an independent certificate issuing authority. Digital certificates are different from each other, and each certificate may provide different levels of trustworthiness. The target terminal certificate is a digital certificate that is preconfigured by a terminal manufacturer in a TEE or an eSE of the target terminal, is used to identify that the target terminal has a protected operating environment (the TEE or the eSE), and may be further used to identify an identity of the terminal for a server in a specific service scenario. The target terminal certificate is obtained by sending a certificate issuing request by the terminal manufacturer to the CA, and includes a public key of the target terminal and a digital signature generated by the certificate authority for the public key of the target terminal.

The first server performs verification on the digital signature of the public key of the target terminal by using the root certificate of the certificate authority, and if the verification succeeds, the target terminal certificate has been verified by the first server, and step 510 is performed.

510. The first server generates a service number.

After the identity of the target terminal has been verified by the first server, the first server needs to generate the service number and the service credential, to subsequently execute a service. The service number (Service Number, SN) is generated by the first server, and is used to identify a sequence number of a bank card adding request service sent by the target terminal to the first server. The service number is identification information for identifying a service, and identifies a specific type of service executed by a specific terminal. In this embodiment of this application, the service number is used to identify a service in which the target terminal restores a virtual bank card by using backup data. The service number may be further stored by the first server and/or a second server into a log of a data migration service between the two terminals.

511. The first server signs the service number by using a private key of the first server, to generate a service credential.

After generating the service number, the first server signs the service number by using the private key of the first server, to generate the service credential. The service credential includes the service number and the signature generated by the first server for the service number. The target terminal may perform verification on the signature in the service credential by using a first server certificate, to ensure that the service number is not tampered with.

512. The first server sends the service credential and a first server certificate to the target terminal.

After signing the service number by using the private key of the first server, to generate the service credential, the first server sends the service credential and the first server certificate to the target terminal. The first server certificate is used to perform verification on the service credential, to ensure that the service number is not tampered with.

513. After receiving the service credential and the first server certificate, the target terminal stores the service credential into a TEE of the target terminal.

Specifically, the service credential may be stored into a random access memory (Random Access Memory, RAM) or a nonvolatile memory of the TEE.

514. The target terminal sends the service number to a second server.

The target terminal decrypts the service credential by using the received first server certificate, to obtain the service number, and sends the service number to the second server.

515. After receiving the service number, the second server signs the service number by using a private key of the second server, to generate an identity credential.

The identity credential is used to prove that a login account in the target terminal is valid, and the identity credential includes the service number and a signature generated by the second server for the service number.

516. The second server sends the identity credential to the target terminal.

After receiving the service number, the second server signs the service number by using the private key of the second server, to generate the identity credential, and sends the identity credential to the target terminal.

517. After receiving the identity credential, the target terminal stores the identity credential into the TEE of the target terminal.

Specifically, the identity credential may be stored into the memory RAM or the nonvolatile memory of the TEE. Steps 507 to 517 are a procedure in which the target terminal obtains a verification credential, where the verification credential includes the service credential and the identity credential. Execution of the procedure is not limited by steps 501 to 506.

518. The target terminal establishes a peer-to-peer wireless communication connection to the original terminal.

The target terminal may establish the peer-to-peer wireless communication connection to the original terminal through BT, NFC, or Wi-Fi P2P.

519. The target terminal performs verification on an original terminal certificate.

In a connection establishment process, the target terminal receives the original terminal certificate, and performs verification on the original terminal certificate by using the root certificate of the certificate authority. It should be noted that step 519 is optional, or step 520 may be directly performed.

If the original terminal certificate has been verified by the target terminal, step 520 is performed.

520. The target terminal sends a request for obtaining bank card data to the original terminal by using the peer-to-peer wireless communication connection.

The request for obtaining bank card data includes the verification credential and the target terminal certificate, where the verification credential includes the service credential and the identity credential. Optionally, the request for obtaining bank card data may include only the verification credential or only the target terminal certificate.

521. After receiving the request for obtaining bank card data, the original terminal performs verification on the service credential, the identity credential, and a target terminal certificate.

Specifically, after receiving a bank card data migration request sent by the target terminal, the original terminal obtains the service credential, the identity credential, and the target terminal certificate from the request, and performs verification. The original terminal may perform verification on the target terminal certificate by using a root certificate preconfigured in the terminal or a root certificate of a certificate authority obtained from a certificate authority server connected to the terminal. The original terminal may perform verification on the service credential by using the obtained first server certificate. The original terminal may perform verification on the identity credential by using an obtained second server certificate. Alternatively, the original terminal may be connected to both the first server and the second server, to obtain the first server certificate from the first server and obtain a second server certificate from the second server, and then perform verification on the service credential by using the first server certificate and perform verification on the identity credential by using the second server certificate.

If the service credential, the identity credential, and the target terminal certificate have been verified by the original terminal, step 522 is performed.

Further, after the service credential, the identity credential, and the target terminal certificate have been verified by the original terminal, the original terminal may inform, in a user interface, the user that the verification succeeds. Optionally, the original terminal can perform step 522 provided that only the verification credential has been verified, or the original terminal can perform step 522 provided that only the target terminal certificate has been verified.

522. The original terminal decrypts the first backup data in the TEE to obtain the first encrypted bank card data.

After the service credential, the identity credential, and the target terminal certificate have been verified by the original terminal, the original terminal decrypts the first backup data by using the access password, to obtain the second encrypted bank card data, and then decrypts the second encrypted bank card data by using the private key of the original terminal, to obtain the first encrypted bank card data.

Optionally, the original terminal obtains, from the eSE, the encrypted rear image of the physical bank card, and performs, in the TEE, decryption by using the private key of the original terminal, to obtain the first encrypted bank card data.

523. The original terminal generates first encrypted data in the TEE.

The original terminal encrypts, by using the public key of the target terminal, the first encrypted bank card data, the identifier of the image processing algorithm, and the parameter used in the image processing algorithm; and signs, by using the private key of the original terminal, the first encrypted bank card data, the identifier of the image processing algorithm, and the parameter used in the image processing algorithm that are encrypted by using the public key of the target terminal, to obtain the first encrypted data. The public key of the target terminal may be obtained from the target terminal certificate, where the target terminal certificate includes the public key of the target terminal. The TEE of the original terminal stores the private key of the original terminal, namely, a private key corresponding to the original terminal certificate.

524. The original terminal sends the first encrypted data to the target terminal through the peer-to-peer wireless communication connection.

After generating the first encrypted data in the TEE, the original terminal sends the first encrypted data to the target terminal. The original terminal sends a bank card data migration response to the target terminal through the peer-to-peer wireless communication connection. The bank card data migration response is a response made by the original terminal to the bank card data migration request sent by the target terminal, and includes the first encrypted data. The first encrypted data includes the first encrypted bank card data, the identifier of the image processing algorithm, and the parameter used in the image processing algorithm that are encrypted by using the public key of the target terminal and that are signed by using the private key of the original terminal.

525. After receiving the first encrypted data, the target terminal obtains bank card account information in the TEE based on the first encrypted data.

After the original terminal sends the first encrypted data to the target terminal through the peer-to-peer wireless communication connection, the target terminal receives the first encrypted data through the peer-to-peer wireless communication connection. Alternatively, the target terminal may receive the bank card data migration response sent by the original terminal, and the target terminal obtains the first encrypted data from the bank card data migration response.

Figure 8:
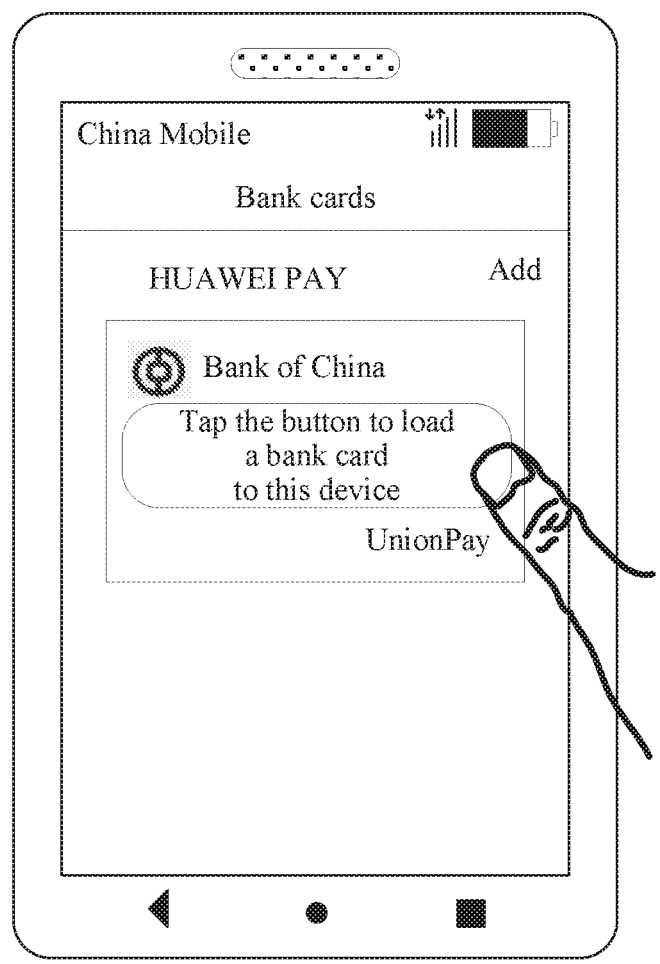
FIG. 8 is a schematic diagram of displaying an interface of a first terminal according to an embodiment of the present invention.

After receiving the first encrypted data through the peer-to-peer wireless communication connection, the target terminal obtains the bank card account information based on the first encrypted data. For example, the first encrypted data is encrypted by using the public key of the target terminal and is signed by using the private key of the original terminal. Therefore, after receiving the first encrypted data sent by the original terminal, the target terminal first performs, by using the original terminal certificate, verification on a signature generated by using the private key of the original terminal, and decrypts the first encrypted data by using a private key of the target terminal, to obtain the first encrypted bank card data, the identifier of the image processing algorithm, and the parameter used in the image processing algorithm. Next, the target terminal invokes a local image processing algorithm based on the identifier of the image processing algorithm and the parameter used in the image processing algorithm, to perform decryption processing on the first encrypted bank card data to obtain the bank card account information image, namely, the front image of the physical bank card, or the front image of the physical bank card and the rear image of the physical bank card. As shown in FIG. 8, the target terminal may display a to-be-activated virtual bank card in a user interface. Then, the target terminal processes the bank card account information image by using the OCR algorithm, to obtain the bank card account information.

After the user selects the to-be-activated virtual bank card, the target terminal processes the bank card account information image by using the OCR algorithm, to obtain the bank card account information that includes the PAN, the validity period, and the CVV. Optionally, the target terminal may further obtain the mobile phone number associated with the card. The target terminal may generate a virtual bank card activation request by using the obtained bank card account information, to request the first server to activate the virtual bank card and download the virtual bank card to the target terminal.

526. The target terminal sends a card issuing request to the first server.

After obtaining the bank card account information based on the first encrypted data, the target terminal sends the card issuing request to the first server, to add a bank card to the first terminal, where the card issuing request includes the bank card account information.

For example, the target terminal sends an activation request to the first server. The activation request includes the bank card account information, and may further include the mobile phone number associated with the card. The first server performs verification the bank card information, sends a verification code to the associated mobile phone number, and receives a verification code (the verification code is automatically filled in or manually entered by the user after the target terminal receives the verification code) returned by the target terminal. In this case, the first server may determine that the card information is correct and the cardholder has been verified. The first server sends an activation response to the target terminal. The activation response includes data related to a virtual bank card, and the virtual bank card is generated by the first server based on the bank card account information included in the activation request. The target terminal receives the activation response sent by the first server. The activation response is used by the target terminal to activate the bank card corresponding to the bank card account information.

For example, the target terminal sends the bank card account information to the first server. After the account information has been verified by the first server and the cardholder has been verified by the first server based on an SMS verification code, the first server returns data to the target terminal, for example, a token of the virtual bank card and a key (the key is stored in the eSE and is used to identify whether the card is valid during transaction) of the virtual bank card. The target terminal configures the token and the card key in the eSE, to activate the to-be-activated virtual bank card. Alternatively, the original terminal may perform verification on the cardholder. The original terminal receives a verification code, and sends the verification code to the target terminal through the peer-to-peer wireless communication connection (or the user may enter, on the target terminal, the verification code received by the original terminal). The target terminal sends, to the first server, both the bank card account information and the verification code that is sent by the original terminal; receives data such as a token and a key returned by the first server after first server confirms that the submitted information is correct; and configures the token and the key in the eSE, to activate the to-be-activated virtual bank card.

It should be noted that, conventionally, a token is hardware for identifying an identity. In this embodiment of this application, the token means a "symbol or representative". To be specific, a card number of a virtual bank card is a representative of a primary account number PAN of a physical bank card. The user uses a mobile phone to submit the primary account number of the physical bank card and additional information to the first server. The first server sends a "representative" of the physical card to the mobile phone. The mobile phone stores the representative into an eSE. The representative is actually a primary account number of the virtual card, and is generated by the first server based on the physical card number. In addition, the first server stores a mapping relationship between the token number and the physical card number. When the mobile phone submits the token to a PoS terminal for consumption, a consumption request is submitted to the first server. The first server translates the token into the physical card number, to send a deduction request to a specific bank. It can be learned that the mobile phone stores the token number rather than the physical card number. In this way, a possibility that the card number of the user is leaked from the mobile phone is reduced, and security is improved. During transaction, in addition to the token, the mobile phone submits, to the PoS terminal, other information such as a card key stored in the eSE, so that security performance is further improved. If the mobile phone stores the physical card number, the mobile phone may be used by a hacker for attack after the mobile phone is stolen.

After successfully performing card issuing, the target terminal performs step 527 and step 528.

527. The target terminal sends a first deregistration message to the first server.

The first deregistration message is used to instruct the first server to deregister the service credential.

528. The target terminal sends a second deregistration message to the second server.

The second deregistration message is used to instruct the second server to deregister the identity credential.

The target terminal sends a service credential deregistration request to the first server, and sends an identity credential deregistration request to the second server, to deregister the two credentials and prevent a replay attack.

In the bank card adding method provided in this embodiment of the present invention, the original terminal stores backup bank card data by using a secure memory in the protected operating environment, and after the identity of the target terminal has been verified, sends the backup bank card data to the target terminal through the peer-to-peer wireless communication connection. Therefore, when the bank card is restored on the target terminal, there is no need to repeat related verification information, to minimize user input and further improve user experience.

Figure 9A:
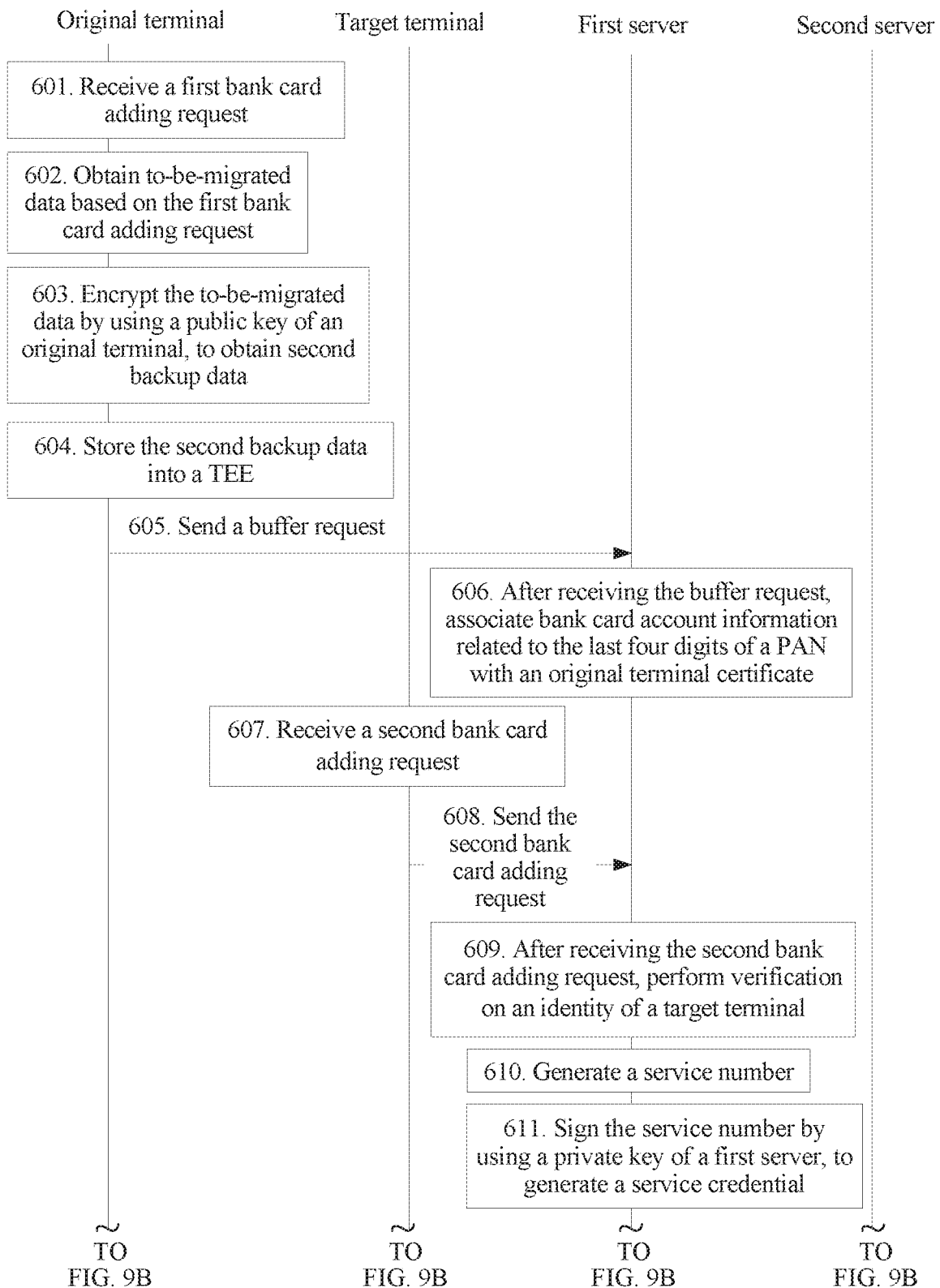
FIG. 9A, FIG. 9B, and FIG. 9C are a flowchart of a bank card adding method according to an embodiment of the present invention.
Figure 9B:
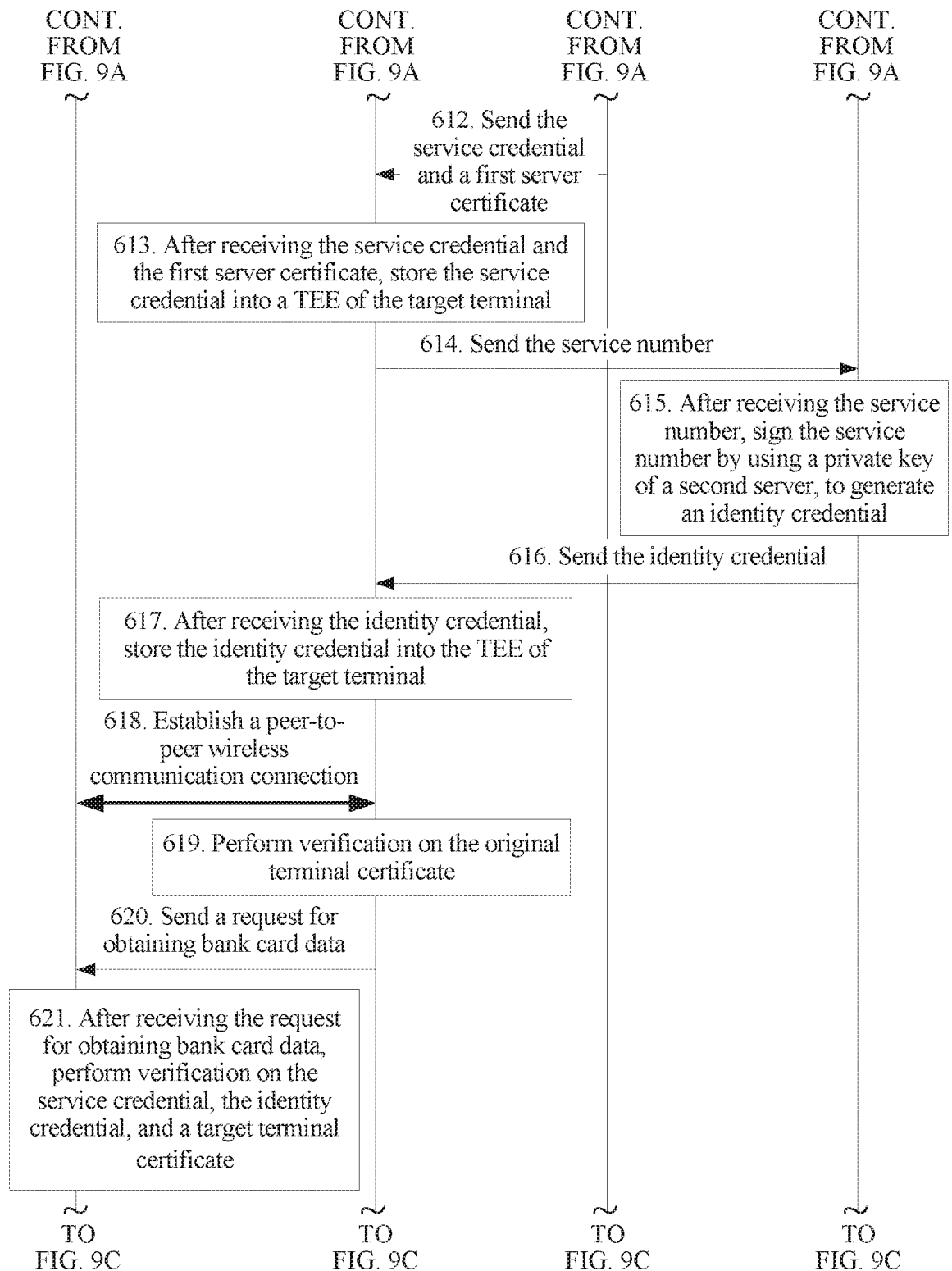
Figure 9C:
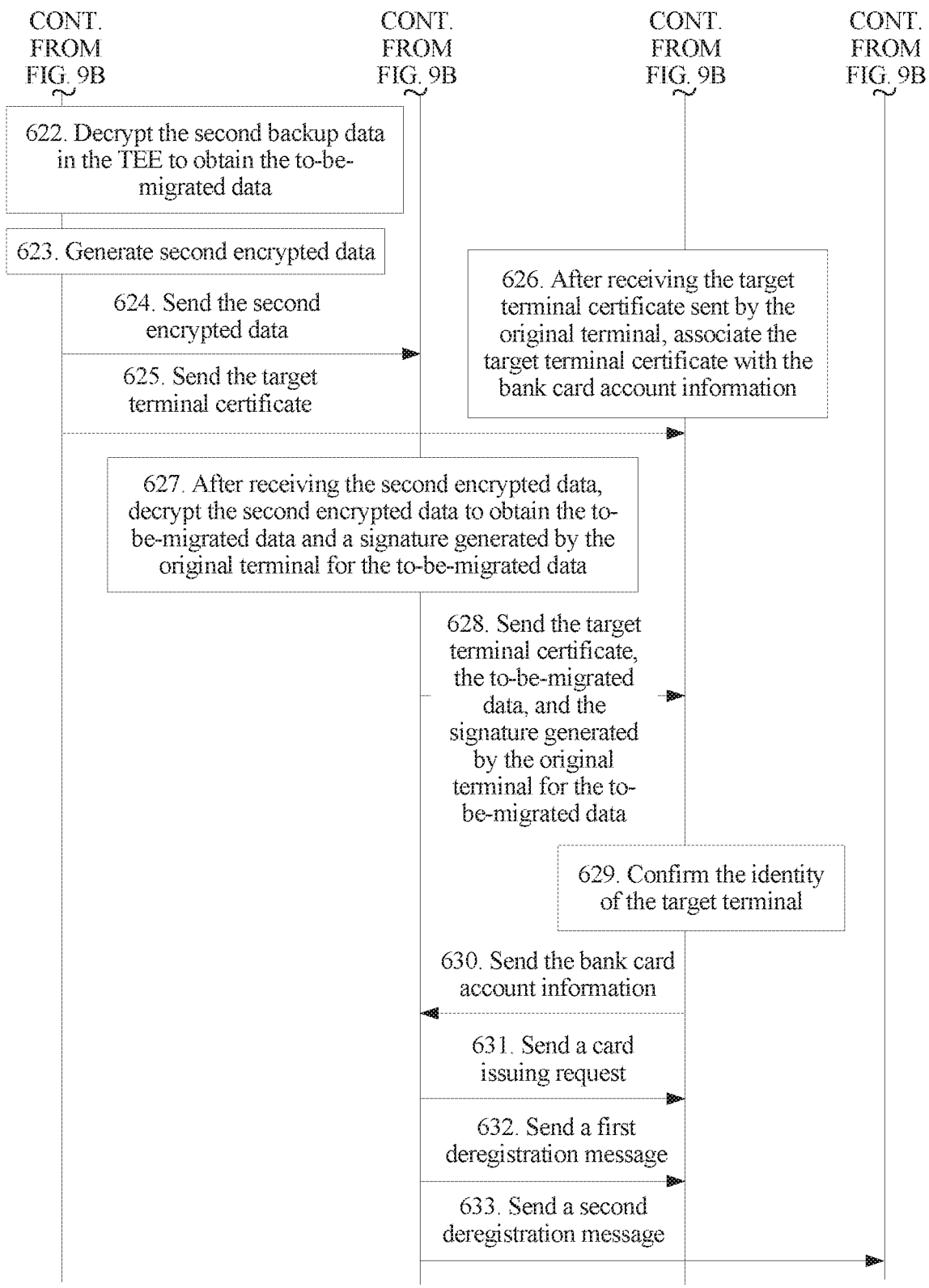

FIG. 9A, FIG. 9B, and FIG. 9C are a flowchart of a bank card adding method according to an embodiment of the present invention. This embodiment details the case in which bank card data includes second encrypted data in FIG. 5. It is assumed that a first terminal is a target terminal, namely, a terminal on which no virtual bank card is issued, and a second terminal is an original terminal, namely, a terminal on which several virtual bank cards have been issued. The original terminal pre-stores second backup data, and the target terminal obtains the second backup data from the original terminal. As shown in FIG. 9A, FIG. 9B, and FIG. 9C, the method specifically includes the following steps.

601. The original terminal receives a first bank card adding request.

For details, refer to detailed descriptions in step 501. Details are not described herein again.

602. The original terminal obtains to-be-migrated data based on the first bank card adding request.

After receiving the first bank card adding request, the original terminal obtains the to-be-migrated data based on the first bank card adding request. The to-be-migrated data includes a BIN and the last four digits of a PAN of one or more bank cards that have been bound to the original terminal. Specifically, the original terminal first obtains a bank card account information image; processes the bank card account information image based on an OCR algorithm, to obtain bank card account information; and extracts the to-be-migrated data from the bank card account information. For a specific method in which the original terminal obtains the bank card account information image and processes the bank card account information image based on the OCR algorithm, to obtain the bank card account information, refer to step 502. Details are not described again in this embodiment of this application.

603. The original terminal encrypts the to-be-migrated data by using a public key of the original terminal, to obtain second backup data.

After obtaining the to-be-migrated data based on the first bank card adding request, the original terminal encrypts the to-be-migrated data by using the public key of the original terminal, to obtain the second backup data. The second backup data is to-be-migrated data obtained after encryption is performed by using the public key of the original terminal.

604. The original terminal stores the second backup data into a TEE.

After encrypting the to-be-migrated data by using the public key of the original terminal, to obtain the second backup data, the original terminal stores the second backup data into the TEE.

605. The target terminal sends a buffer request to a first server.

After storing the second backup data into the TEE, the original terminal sends the buffer request to the first server. The buffer request includes the last four digits of the PAN of the bank card and an original terminal certificate. The buffer request is used to request the first server to associate bank card terminal account information related to the last four digits of the PAN with the original terminal certificate. The first server pre-stores the bank card account information related to the last four digits of the PAN.

Further, the first server may associate an access password PIN1 with the bank card account information, and send the PIN1 to the original terminal. The original terminal encrypts the PIN1 by using the public key of the original terminal, and stores the encrypted PIN1 into the TEE of the original terminal. Then, the original terminal sets a PIN2 or a fingerprint to control access to the PIN1. In other words, the bank account information buffered by the first server can be protected by using at least one password.

606. After receiving the buffer request, the first server associates bank card account information related to the last four digits of a PAN with an original terminal certificate.

Associating the bank card account information related to the last four digits of the PAN with the original terminal certificate is storing a mapping relationship between the bank card account information and the original terminal certificate.

After receiving the buffer request sent by the original terminal, the first server obtains the related bank card account information based on the last four digits of the PAN, and associates the bank card account information with the original terminal certificate and the PIN1. Steps 601 to 606 are a process in which the original terminal sends the request to the first server to store data related to a bank card account at a server end, and the process is usually performed when a bank card is being added to the original terminal.

Step 607 to step 621 are the same as steps 507 to 521 shown in FIG. 6. Details are not described again in this embodiment of this application.

622. The original terminal decrypts the second backup data in the TEE to obtain the to-be-migrated data.

The original terminal decrypts the second backup data by using a private key of the original terminal, to obtain the to-be-migrated data, namely, the BIN and the last four digits of the PAN number. The original terminal further signs the to-be-migrated data by using the private key of the original terminal.

623. The original terminal generates second encrypted data.

After decrypting the second backup data to obtain the to-be-migrated data, the original terminal generates the second encrypted data. The original terminal encrypts, by using a public key in the target terminal certificate, the to-be-migrated data and a signature generated by the original terminal for the to-be-migrated data; and signs, by using the private key of the original terminal, the to-be-migrated data encrypted by using the public key of the target terminal, to obtain the second encrypted data. The public key of the target terminal may be obtained from the target terminal certificate, where the target terminal certificate includes the public key of the target terminal. The TEE of the original terminal stores the private key of the original terminal. The private key is corresponding to the public key in the original terminal certificate, and the two keys are a pair of asymmetric keys.

624. The original terminal sends the second encrypted data to the target terminal.

After generating the second encrypted data, the original terminal sends the second encrypted data to the target terminal through the peer-to-peer wireless communication connection. The original terminal sends a bank card data migration response to the target terminal through the peer-to-peer wireless communication connection. The bank card data migration response is a response made by the original terminal to a bank card data migration request sent by the target terminal. The bank card data migration response includes the second encrypted data. The second encrypted data includes the to-be-migrated data that is encrypted by using the public key of the target terminal and that is signed by using the private key of the original terminal.

625. The original terminal sends the target terminal certificate to the first server.

626. After receiving the target terminal certificate sent by the original terminal, the first server associates the target terminal certificate with the bank card account information.

In this way, when the target terminal requests to obtain the bank card account information backed up in the first server, the first server may check the identity of the target terminal by using the target terminal certificate provided by the original terminal, to be specific, determine, through comparison, whether a certificate of a terminal that requests to obtain the data is consistent with the certificate sent by the original terminal. It should be noted that step 625 and step 626 are optional.

627. After receiving the second encrypted data, the target terminal decrypts the second encrypted data to obtain the to-be-migrated data and a signature generated by the original terminal for the to-be-migrated data.

The second encrypted data is encrypted by using the public key of the target terminal and is signed by using the private key of the original terminal. Therefore, after receiving the second encrypted data sent by the original terminal, the target terminal first performs, by using the public key in the original terminal certificate, verification on the signature generated by using the private key of the original terminal, and decrypts first encrypted data by using a private key of the target terminal, to obtain the to-be-migrated data, namely, the BIN and the last four digits of the PAN, and the signature of the to-be-migrated data.

628. The target terminal sends, to the first server, the target terminal certificate, the to-be-migrated data, and the signature generated by the original terminal for the to-be-migrated data.

629. After receiving the first terminal certificate, the to-be-migrated data, and the signature generated by the second terminal for the to-be-migrated data, the first server confirms the identity of the target terminal.

The first server may preconfigure a root certificate of the CA that issues the target terminal certificate, and perform verification on the target terminal certificate by using the root certificate, to confirm that the target terminal is a valid terminal. Optionally, the first server may compare the target terminal certificate sent by the original terminal with a terminal certificate included in an activation request, and only when the two certificates are consistent and verification performed by using the root certificate succeeds, the first server confirms that the target terminal is valid.

630. The first server sends the bank card account information to the target terminal.

Further, when obtaining the bank card account information related to the to-be-migrated data, a user may request to provide an obtaining password. The obtaining password may be provided by the original terminal, or may be obtained by using an interface of the target terminal.

631. After receiving the bank card account information, the first terminal sends a card issuing request to the first server.

After obtaining the bank card account information related to the to-be-migrated data, the target terminal may generate a virtual card issuing request by using the bank card account information and a mobile phone number reserved by the user in a bank, and submit the request to the first server. The first server returns an SMS verification code to the reserved mobile phone number. The target terminal obtains the SMS verification code, and submits the code to the first server. If the first server verifies that the verification code is correct, the first server determines that a cardholder has been verified, and returns virtual bank card data such as a token and a key of a virtual bank card to the target terminal. The target terminal generates a bank card on the target terminal, and adjusts a state of the bank card to a normal state. For details, refer to detailed descriptions in step 526. Details are not described herein again.

After successfully performing card issuing, the target terminal performs step 632 and step 633.

632. The target terminal sends a first deregistration message to the first server.

The first deregistration message is used to instruct the first server to deregister the service credential.

633. The target terminal sends a second deregistration message to the second server.

The second deregistration message is used to instruct the second server to deregister the identity credential.

The target terminal sends a service credential deregistration request to the first server, and sends an identity credential deregistration request to the second server, to deregister the two credentials and prevent a replay attack.

In the bank card adding method provided in this embodiment of the present invention, the original terminal stores backup bank card data by using a secure memory in the protected operating environment, and after the identity of the target terminal has been verified, sends the backup bank card data to the target terminal through the peer-to-peer wireless communication connection. Therefore, when the bank card is restored on the target terminal, there is no need to repeat related verification information, to minimize user input and further improve user experience.

Figure 10A:
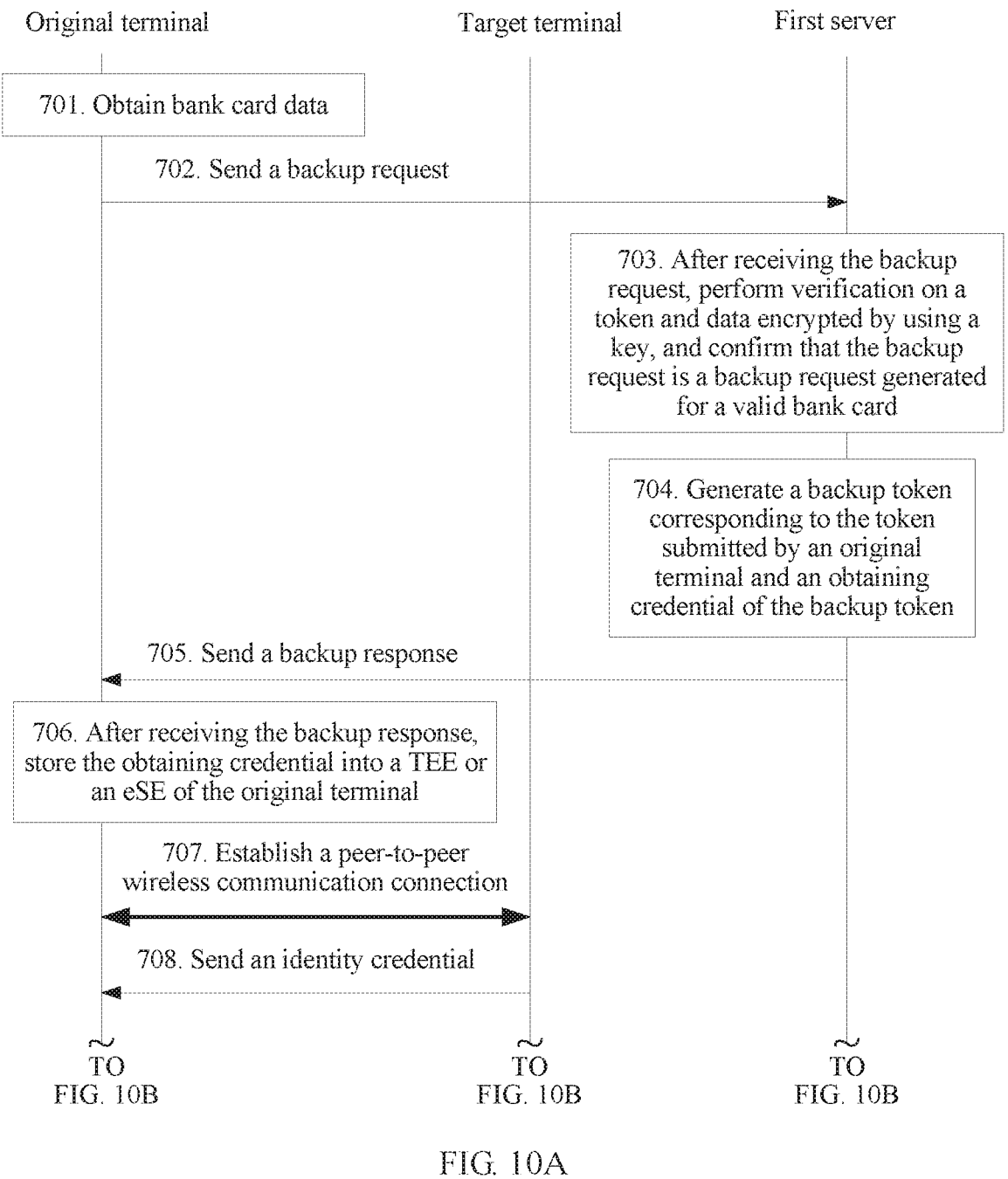
FIG. 10A and FIG. 10B are a flowchart of a bank card adding method according to an embodiment of the present invention.
Figure 10B:
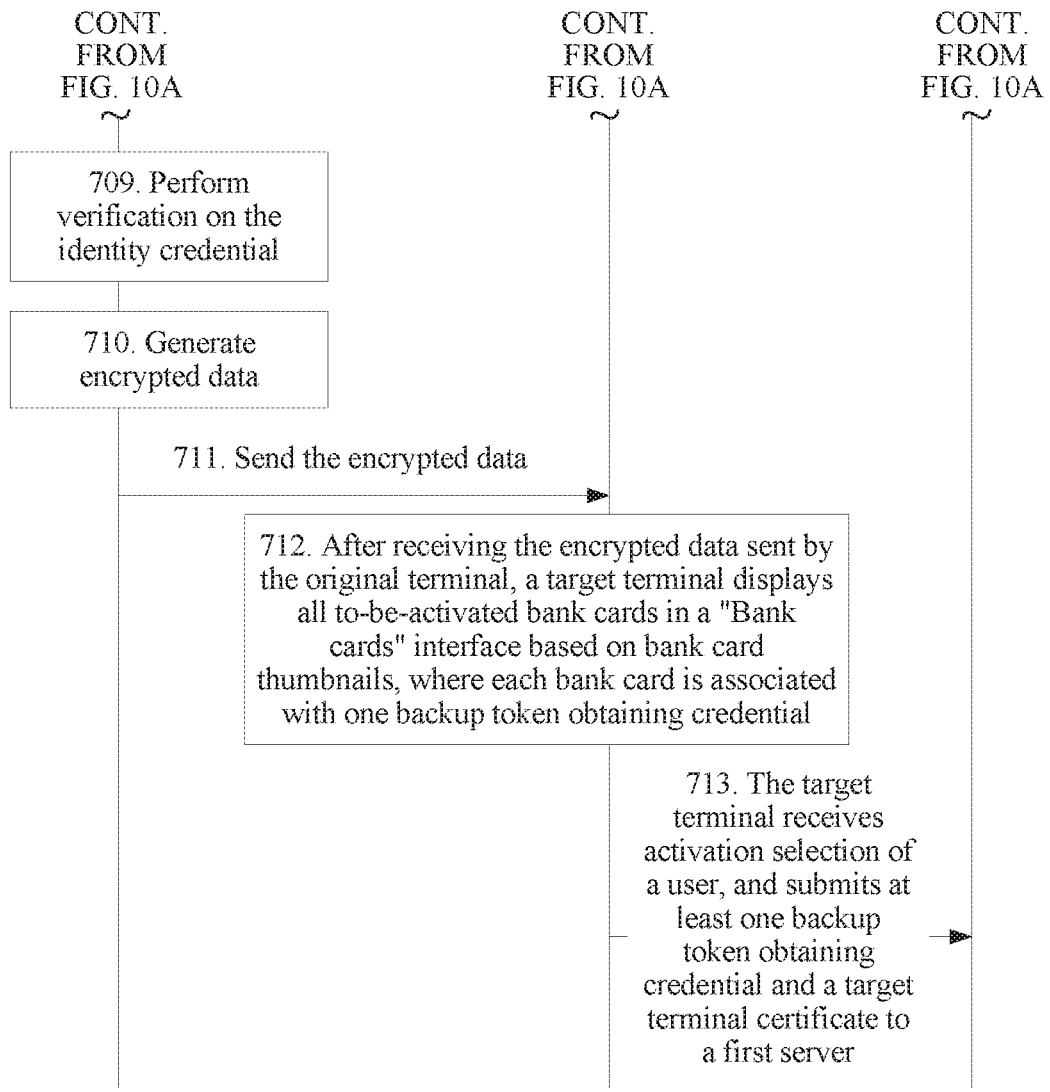

FIG. 10A and FIG. 10B are a flowchart of a bank card adding method according to an embodiment of the present invention. A difference between this embodiment and the foregoing embodiment is as follows: A first server sets an obtaining credential for obtaining bank card data and stores the obtaining credential into a second terminal, and when a first terminal obtains the bank card data by using the obtaining credential, a user only needs to perform simple authentication to rapidly restore a device card. It is assumed that the first terminal is a target terminal, namely, a terminal on which no virtual bank card is issued, and the second terminal is an original terminal, namely, a terminal on which several virtual bank cards have been issued. As shown in FIG. 104 and FIG. 10B, the method specifically includes the following steps.

701. The original terminal obtains bank card data.

After successfully adding a bank card, the original terminal receives a data backup request; pops up a user identity verification interface; verifies whether a current user of the original terminal is a valid user of a payment application; and after the verification succeeds, prompts, by using a UI interface, the user to select a virtual bank card that needs to be migrated.

702. The target terminal sends a backup request to the first server.

The original terminal determines the selected bank card and sends the backup request to the first server. The backup request includes a token corresponding to the bank card, a token validity period, and data encrypted by using a bank card key, for example, a challenge value provided by a TSP or a backup card generation request generated by the original terminal. The foregoing data may be further signed by using a private key of the original terminal.

703. After receiving the backup request, the first server performs verification on a token and data encrypted by using a key, and confirms that the backup request is a backup request generated for a valid bank card.

704. The first server generates a backup token corresponding to the token submitted by the original terminal and an obtaining credential of the backup token.

The obtaining credential is encrypted by using a public key of the original terminal.

705. The first server sends a backup response to the original terminal.

The backup response includes the obtaining credential of the backup token.

706. After receiving the backup response, the original terminal stores the obtaining credential into a TEE or an eSE of the original terminal.

The backup token and the token provided by the original terminal are generated by using a same PAN. The obtaining credential of the backup token can be used to obtain the backup token from the server.

707. The target terminal establishes a peer-to-peer wireless communication connection to the original terminal.

The target terminal may establish the peer-to-peer wireless communication connection to the original terminal through BT, NFC, or Wi-Fi P2P. Particularly, in this case, both the target terminal and the original terminal log in to a same account of the payment application.

708. The target terminal sends an identity credential to the original terminal through the peer-to-peer wireless communication connection.

The identity credential may be a target terminal certificate.

709. After receiving the identity credential sent by the target terminal, the original terminal performs verification on the identity credential.

The original terminal may preconfigure a root CA certificate, to perform verification on the target terminal certificate. Optionally, the original terminal may perform verification on the target terminal certificate by using a root certificate in a TEE certificate chain of the original terminal, and if the verification succeeds, confirms that the target terminal is a valid terminal. Optionally, the original terminal sends a certificate of the valid terminal to the first server.

710. The original terminal generates encrypted data.

The original terminal encrypts, by using a public key in the target terminal certificate, all backup token obtaining credentials and bank card thumbnails, and sends the backup token obtaining credentials and the bank card thumbnails to the target terminal. Optionally, the original terminal may send the target terminal certificate to the first server.

711. The original terminal sends the encrypted data to the target terminal through the peer-to-peer wireless communication connection.

712. After the target terminal receives the encrypted data sent by the original terminal, the target terminal displays all to-be-activated bank cards in a "Bank cards" interface based on bank card thumbnails, where each bank card is associated with one backup token obtaining credential.

713. The target terminal receives activation selection of a user, and submits at least one backup token obtaining credential and a target terminal certificate to the first server.

The first server performs verification on the target terminal certificate by using a preconfigured root CA certificate. Optionally, the first server compares the target terminal certificate sent by the original terminal with the certificate provided by the target terminal, and only when the two certificates are consistent and the verification performed by using the root CA certificate succeeds, confirms that the target terminal is a valid terminal. Then, the first server sends the backup token and a related key to the target terminal. After receiving the backup token and the related key, the target terminal stores the backup token and the related key in an eSE. Finally, the target terminal modifies, to an activated state, a state of a bank card whose backup token is received.

The foregoing mainly describes the solutions provided in the embodiments of the present invention from a perspective of interaction between network elements. It may be understood that, to implement the foregoing functions, each network element such as the first terminal or the second terminal includes a corresponding hardware structure and/or software module for implementing each function. A person skilled in the art should be easily aware that, algorithm steps in the examples described with reference to the embodiments disclosed in this specification may be implemented in a form of hardware or a combination of hardware and computer software in the present invention. Whether a function is implemented by using hardware or computer software driving hardware depends on particular applications and design constraint conditions of the technical solutions. A person skilled in the art may use different methods to implement the described functions for each particular application, but it should not be considered that the implementation goes beyond the scope of the present invention.

In the embodiments of the present invention, the first terminal and the second terminal may be divided into function modules based on the foregoing method examples. For example, each function module may be obtained through division based on a corresponding function, or at least two functions may be integrated into one processing module. The integrated module may be implemented in a form of hardware, or may be implemented in a form of a software function module. It should be noted that, the module division in the embodiments of the present invention is an example and is only logical function division. There may be another division manner in actual implementation.

Figure 11:
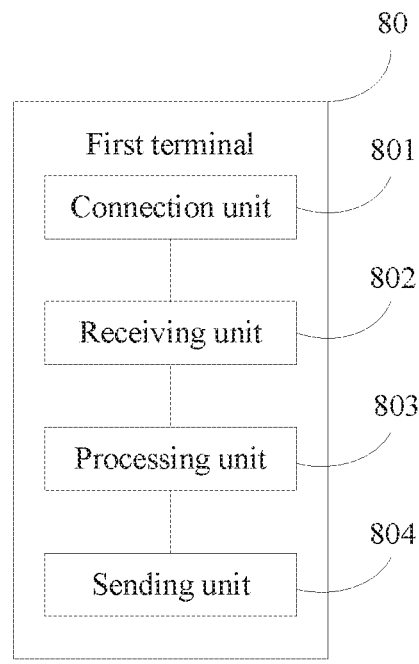
FIG. 11 is a schematic structural diagram of a first terminal according to an embodiment of the present invention.

When each function module is obtained through division based on a corresponding function, FIG. 11 is a possible schematic composition diagram of the first terminal in the foregoing embodiments. As shown in FIG. 11, the first terminal 80 may include a connection unit 801, a receiving unit 802, a processing unit 803, and a sending unit 804.

The connection unit 801 is configured to support the first terminal in performing step 402 in the bank card adding method shown in FIG. 5, step 518 in the bank card adding method shown in FIG. 7B, step 618 in the bank card adding method shown in FIG. 9B, and step 707 in the bank card adding method shown in FIG. 10A.

The receiving unit 802 is configured to support the first terminal in performing steps 401 and 406 in the bank card adding method shown in FIG. 5, steps 507, 513, 517, and 525 in the bank card adding method shown in FIG. 7A, FIG. 79, and FIG. 7C, steps 607, 613, 617, and 627 in the bank card adding method shown in FIG. 9A, FIG. 9B, and FIG. 9C, and step 712 in the bank card adding method shown in FIG. 10B.

The processing unit 803 is configured to support the first terminal in performing step 407 in the bank card adding method shown in FIG. 5, steps 519 and 525 in the bank card adding method shown in FIG. 7B and FIG. 7C, and steps 619 and 627 in the bank card adding method shown in FIG. 9B and FIG. 9C.

The sending unit 804 is configured to support the first terminal in performing steps 403 and 408 in the bank card adding method shown in FIG. 5, steps 508, 514, 526, 527, and 528 in the bank card adding method shown in FIG. 7A and FIG. 7C, steps 608, 614, 628, 631, 632, and 633 in the bank card adding method shown in FIG. 9A, FIG. 9B, and FIG. 9C, and step 713 in the bank card adding method shown in FIG. 9.

It should be noted that, all related content of the steps in the method embodiments may be cited as function descriptions of all corresponding function modules, and details are not described herein again.

The first terminal provided in this embodiment of the present invention is used to execute the foregoing bank card adding method. Therefore, same effects as those achieved in the foregoing bank card adding method can be achieved.

Figure 12:
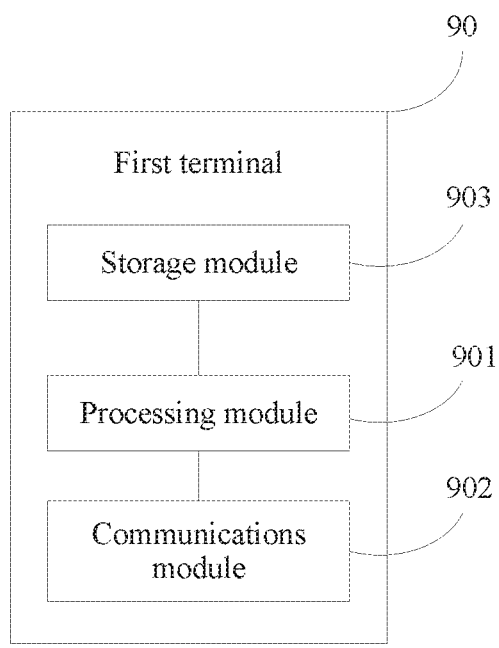
FIG. 12 is a schematic structural diagram of a first terminal according to an embodiment of the present invention.

When an integrated unit is used, FIG. 12 is another possible schematic composition diagram of the first terminal in the foregoing embodiments. As shown in FIG. 12, the first terminal 90 includes a processing module 901 and a communications module 902.

The processing module 901 is configured to control and manage an action of the first terminal. For example, the processing module 901 is configured to support the first terminal in performing step 407 in the terminal shown in FIG. 5, step 519 in the bank card adding method shown in FIG. 713, step 619 in the bank card adding method shown in FIG. 9B, and/or another technical process described in this specification. The communications module 902 is configured to support the first terminal in communicating with another network entity, for example, communication between a first server and a second server shown in FIG. 5, FIG. 7A, FIG. 7B, and FIG. 7C, FIG. 9A, FIG. 9B, and FIG. 9C, and FIG. 10A and FIG. 10B. The first terminal may further include a storage module 903, configured to store program code and data of the first terminal.

The processing module 901 may be a processor or a controller. The processing module may implement or execute various example logic blocks, modules, and circuits that are described with reference to content disclosed in the present invention. Alternatively, the processor may be a combination that implements a computing function, for example, a combination that includes one or more microprocessors, or a combination of a DSP and a microprocessor. The communications module 902 may be a transceiver, a transceiver circuit, a communications interface, or the like. The storage module 903 may be a memory.

When the processing module 901 is a processor, the communications module 902 is a communications interface, and the storage module 903 is a memory, the first terminal in this embodiment of the present invention may be the terminal shown in FIG. 4.

Figure 13:
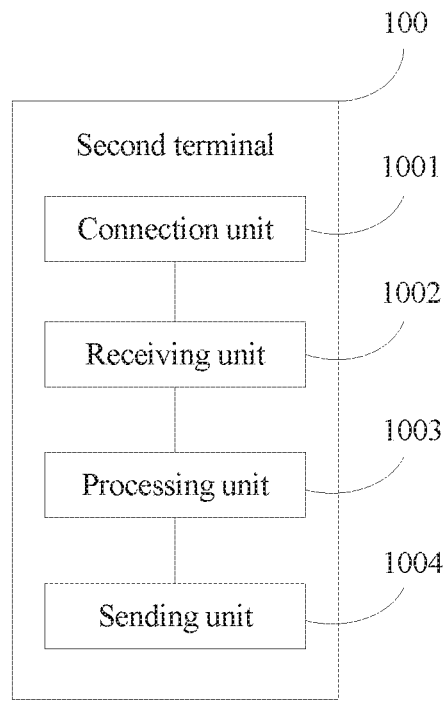
FIG. 13 is a schematic structural diagram of a second terminal according to an embodiment of the present invention.

When each function module is obtained through division based on a corresponding function, FIG. 13 is a possible schematic composition diagram of the second terminal in the foregoing embodiments. As shown in FIG. 13, the second terminal 100 may include a connection unit 1001, a receiving unit 1002, a processing unit 1003, and a sending unit 1004.

The connection unit 1001 is configured to support the first terminal in performing step 402 in the bank card adding method shown in FIG. 5, step 518 in the bank card adding method shown in FIG. 7B, step 618 in the bank card adding method shown in FIG. 9B, and step 707 in the bank card adding method shown in FIG. 10A.

The receiving unit 1002 is configured to support the second terminal in performing step 404 in the bank card adding method shown in FIG. 5, steps 501 and 521 in the bank card adding method shown in FIG. 7A and FIG. 7B, steps 601 and 621 in the bank card adding method shown in FIG. 9A and FIG. 9B, and step 706 in the bank card adding method shown in FIG. 10A.

The processing unit 1003 is configured to support the second terminal in performing steps 502 to 506 and steps 522 and 523 in the bank card adding method shown in FIG. 7A and FIG. 7C, steps 602 to 604, step 621, step 622, and step 623 in the bank card adding method shown in FIG. 9A, FIG. 9B, and FIG. 9C, and steps 709 and 710 in the bank card adding method shown in FIG. 109.

The sending unit 1004 is configured to support the second terminal in performing step 405 in the bank card adding method shown in FIG. 5, step 524 in the bank card adding method shown in FIG. 7C, steps 605, 624, and 625 in the bank card adding method shown in FIG. 9A and FIG. 9C, and steps 702 and 711 in the bank card adding method shown in FIG. 10A and FIG. 10B.

It should be noted that, all related content of the steps in the method embodiments may be cited as function descriptions of all corresponding function modules, and details are not described herein again.

The second terminal provided in this embodiment of the present invention is used to execute the foregoing bank card adding method. Therefore, same effects as those achieved in the foregoing bank card adding method can be achieved.

Figure 14:
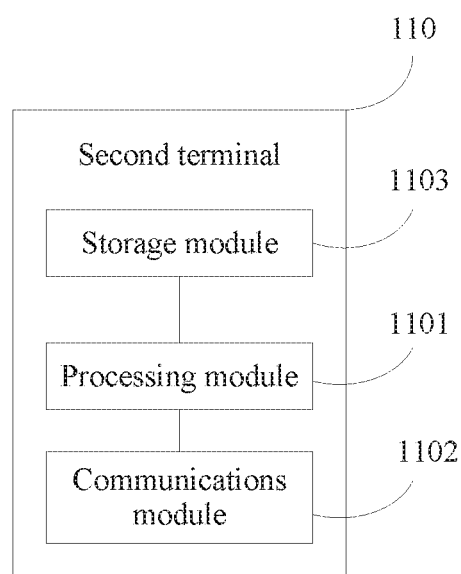
FIG. 14 is a schematic structural diagram of a second terminal according to an embodiment of the present invention.

When an integrated unit is used, FIG. 14 is another possible schematic composition diagram of the second terminal in the foregoing embodiments. As shown in FIG. 14, the second terminal 110 includes a processing module 1101 and a communications module 1102.

The processing module 1101 is configured to control and manage an action of the second terminal. The communications module 1102 is configured to support the second terminal in communicating with another network entity, for example, communication between a first server and a second server shown in FIG. 5, FIG. 7A, FIG. 7B, and FIG. 7C, FIG. 9A, FIG. 9B, and FIG. 9C, and FIG. 10A and FIG. 10B. The second terminal may further include a storage module 1103, configured to store program code and data of the second terminal.

The processing module 1101 may be a processor or a controller. The processing module may implement or execute various example logic blocks, modules, and circuits that are described with reference to content disclosed in the present invention. Alternatively, the processor may be a combination that implements a computing function, for example, a combination that includes one or more microprocessors, or a combination of a DSP and a microprocessor. The communications module 1102 may be a transceiver, a transceiver circuit, a communications interface, or the like. The storage module 1103 may be a memory.

When the processing module 1101 is a processor, the communications module 1102 is a transceiver, and the storage module 1103 is a memory, the second terminal in this embodiment of the present invention may be the terminal shown in FIG. 4.

It may be clearly understood by a person skilled in the art from the descriptions of the foregoing implementations that, for the purpose of convenient and brief description, division of the foregoing function modules is only used as an example for illustration. In actual application, the foregoing functions may be allocated to different modules and implemented based on a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is only an example. For example, the module or unit division is only logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions in the embodiments.

In addition, function units in the embodiments of the present invention may be integrated into one processing unit, or each of the units may exist alone physically, or at least two units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions in the embodiments of the present invention essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are only specific implementations of the present invention, but are not intended to limit the protection scope of the present invention. Any variation or replacement within the technical scope disclosed in the present invention shall fall within the protection scope of the present invention. Therefore, the protection scope of the present invention shall be subject to the protection scope of the claims.

What is claimed is:

1. A system comprising:
a first mobile phone having a first digital wallet; and
a second mobile phone, having a second digital wallet including a first payment card, wherein the first mobile phone is capable of directly connecting with the second mobile phone via a wireless communication connection,
wherein the first mobile phone comprises:
a display configured to display a first option for adding a first payment card to the first digital wallet;
a processor coupled to the display and configured to:
detect a first selection of the first option; and
send, to the second mobile phone, a first request to obtain a first data related to the first payment card in response to the first selection of the first option; and a receiver coupled to the processor and configured to receive, directly from the second mobile phone via the wireless communication connection, the first data, wherein the first data is encrypted; and wherein the processor is further configured to add the first payment card to the first digital wallet after successfully decrypting the data, wherein the second mobile phone comprises:

a receiver configured to receive the first request from the first mobile phone; and a transmitter configured to send, directly to the first mobile phone via the wireless communication connection, the first data in response to receiving the first request, wherein the first mobile phone and the second mobile phone log into a same account.

2. The system of claim 1, wherein the display of the first mobile phone is further configured to display a second option for adding a second payment card to the first digital wallet, and wherein the processor of the first mobile phone is further configured to:

detect a second selection of the second option;

obtain a second data inputted by a user in response to the second selection of the second option, wherein the second data is related to the second payment card; and add the second payment card to the first digital wallet based on the second data.

3. The system of claim 2, wherein the second data includes at least one of:

a bank identification number (BIN) of the second payment card, a primary account number (PIN) of the second payment card, a payment card verification value (CVV) of the second payment card, or a validity period of the second payment card.

4. The system of claim 1, wherein the processor of the first mobile phone is further configured to decrypt the first data using a private key of the first mobile phone, and wherein the second mobile phone further comprises a second processor configured to encrypt the first data with a public key of the first mobile phone.

5. The system of claim 1, wherein the wireless communication connection is a Wi-Fi connection or a BLUETOOTH connection.

6. The system of claim 1, wherein the processor is further configured to decrypt the first data on a trusted execution environment (TEE) of the first mobile phone.

7. An electronic device comprising:

a memory comprising instructions;

a processor coupled to the memory and configured to execute the instructions, which cause the processor to be configured to:

display a first option for adding a first payment card to a digital wallet of the electronic device using encrypted data received from an other electronic device, wherein the electronic device and the other electronic device log into a same account;

detect a selection of the first option;

send, directly to the other electronic device via a wireless communication connection, a request to obtain the encrypted data related to the first payment card;

receive, directly from the other electronic device via the wireless communication connection, the encrypted data, wherein the encrypted data includes secure information describing the first payment card; and add the first payment card to said digital wallet of the electronic device after successfully decrypting the encrypted data.

8. The electronic device of claim 7, wherein the wireless communication connection is a Wi-Fi connection.

9. The electronic device of claim 7, wherein the instructions further cause the processor to:

display a second option for adding a second payment card to the digital wallet of the electronic device;

detect a second selection of the second option;

obtain a data inputted by a user in response to the second selection of the second option, wherein the data includes secure information describing the second payment card; and add the second payment card to the digital wallet of the electronic device based on the data.

10. The electronic device of claim 9, wherein the data includes at least one of:

a bank identification number (BIN) of the second payment card, a primary account number (PIN) of the second payment card, a payment card verification value (CVV) of the second payment card, or a validity period of the second payment card.

11. The electronic device of claim 7, wherein the instructions further cause the processor to be configured to decrypt the encrypted data using a private key of the electronic device, and wherein the encrypted data is encrypted with a public key of the electronic device.

12. The electronic device of claim 7, wherein the instructions further cause the processor to decrypt the encrypted data on a trusted execution environment (TEE) of the electronic device.

13. The electronic device of claim 7, wherein the wireless communication connection is a BLUETOOTH connection.

14. A method performed by a first electronic device, comprising:

displaying, by a display of the first electronic devise, a first option for adding a payment card to a first digital wallet using encrypted data received from a second electronic device, wherein the encrypted data includes secure information describing the payment card, and wherein the second electronic device and the first electronic device log into a same account;

detecting a selection of the first option on the display;

sending, directly to the second electronic device via a wireless communication connection, a request to obtain the encrypted data in response to the selection of the first option;

receiving, from the second electronic device via the wireless communication connection, the encrypted data; and adding said payment card to said digital wallet after successfully decrypting the encrypted data.

15. The method of claim 14, further comprising displaying a second option for adding the payment card by inputting a data related to the payment card.

16. The method of claim 15, wherein the data includes at least one of:

a bank identification number (BIN) of the payment card, a primary account number (PIN) of the payment card, a payment card verification value (CVV) of the payment card, or a validity period of the payment card.

17. The method of claim 14, wherein the wireless communication connection is a Wi-Fi connection.

18. The method of claim 14, further comprising:
  encrypting the encrypted data using a public key of the first electronic device; and
  decrypting the encrypted data using a private key of the first electronic device.

19. The method of claim 18, further comprising encrypting and decrypting the encrypted data in a trusted execution environment (TEE).

20. The method of claim 14, wherein the wireless communication connection is a BLUETOOTH connection.

* * * * *

UNITED STATES PATENT AND TRADEMARK OFFICE
CERTIFICATE OF CORRECTION

PATENT NO. : 11,017,373 B2  
APPLICATION NO. : 16/480865  
DATED : May 25, 2021  
INVENTOR(S) : Guoqing Li and Jingqing Mei It is certified that error appears in the above-identified patent and that said Letters Patent is hereby corrected as shown below:

In the Claims

Claim 14, Column 38, Line 39: "first electronic devise" should read "first electronic device"

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*